(12) United States Patent
Ozawa et al.

(10) Patent No.: US 7,370,953 B2
(45) Date of Patent: May 13, 2008

(54) INKJET RECORDING INK

(75) Inventors: Takashi Ozawa, Shizuoka (JP); Naotaka Wachi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 371 days.

(21) Appl. No.: 10/771,464

(22) Filed: Feb. 5, 2004

(65) Prior Publication Data

US 2004/0155947 A1 Aug. 12, 2004

(30) Foreign Application Priority Data

Feb. 5, 2003 (JP) ............... P.2003-028484

(51) Int. Cl.
*C09D 11/00* (2006.01)

(52) U.S. Cl. ............... 347/100; 347/95; 347/96; 347/101; 106/31.13; 106/31.6; 106/31.27; 523/160

(58) Field of Classification Search ........ 347/100, 347/95, 96, 101; 106/31.27, 31.13, 31.6; 523/160
See application file for complete search history.

(56) References Cited

U.S. PATENT DOCUMENTS

| | | | |
|---|---|---|---|
| 5,605,566 A | | 2/1997 | Yui et al. |
| 6,336,721 B1 * | | 1/2002 | Provost et al. ............. 347/100 |
| 2001/0029869 A1 * | | 10/2001 | Fujiwara ................. 106/31.49 |
| 2002/0143079 A1 * | | 10/2002 | Yamanouchi et al. ....... 523/160 |
| 2003/0117472 A1 * | | 6/2003 | Pearlstine et al. ............ 347/97 |
| 2004/0050291 A1 * | | 3/2004 | Taguchi et al. .......... 106/31.27 |

FOREIGN PATENT DOCUMENTS

| | | |
|---|---|---|
| JP | 55-150396 A | 11/1980 |
| JP | 62-124166 A | 6/1987 |
| JP | 3-163175 A | 7/1991 |
| JP | 3-172362 A | 7/1991 |
| JP | 5-331395 A | 12/1993 |
| JP | 8-193176 A | 7/1996 |
| JP | 08-269378 A | 10/1996 |
| JP | 9-272826 A | 10/1997 |
| JP | 10-158551 A | 6/1998 |
| JP | 10-158560 A | 6/1998 |
| JP | 10-204349 A | 8/1998 |
| JP | 10-324835 A | 12/1998 |
| JP | 2001-240781 A | 9/2001 |
| JP | 2001-279145 A | 10/2001 |

OTHER PUBLICATIONS

Office Action dated Oct. 17, 2007 for Japanese Patent Application No. 2003-028484, Japanese Patent Office.

* cited by examiner

*Primary Examiner*—Manish S. Shah
*Assistant Examiner*—Laura E. Martin
(74) *Attorney, Agent, or Firm*—Sughrue Mion, PLLC

(57) ABSTRACT

An inkjet recording ink includes at least one yellow-azo dye having specific properties or a specific structure dissolved and/or dispersed in an aqueous medium and containing a water-miscible organic solvent having a specific solubility with respect to dye.

7 Claims, No Drawings

INKJET RECORDING INK

BACKGROUND OF THE INVENTION

1. Field of the Invention

The present invention relates to an aqueous ink for inkjet recording which is improved in bleeding on recording medium, provides an excellent image quality and exhibits an excellent handleability and safety.

2. Background Art

In recent years, following the spread of computers, inkjet printers are widely utilized for printing on paper, films, cloths, etc. in not only offices but also households.

The inkjet recording method includes a mode of applying a pressure by a piezoelectric element to discharge droplets; a mode of generating bubbles in an ink by heat to discharge droplets; a mode of using ultrasonic wave; and a mode of sucking and discharging droplets by electrostatic force. As ink compositions for such inkjet recording, aqueous inks, oil based inks, or solid (melt type) inks are used. Of these inks, aqueous inks are the main current from the standpoints of manufacture, handling, smell, safety, etc.

With respect to coloring agents that are used in these inkjet recording inks, there are requirements that they have high solubility in solvent; that they can undergo high-density recording; that they have good hue; that they have excellent fastness to light, heat, air, water, and chemicals; that they have good fixation to an image receiving material and hardly cause bleeding; that they have excellent preservability as an ink; that they have no toxicity; that they have high purity; and that they can be cheaply obtained. However, it is extremely difficult to seek coloring agents that can meet these requirements at high levels.

Though various inkjet dyes and pigments have already been proposed and actually used, it is the present state that coloring agents that can meet all of the requirements have not yet been discovered. According to the conventionally well known dyes and pigments to which color index (C.I.) numbers are assigned, it is difficult to reconcile hue and fastness required for inkjet recording inks.

With the trend toward the rise of capacity for electrostatic digital image data, there is a growing demand for recording of images having a higher precision and quality. In order to meet this demand, it is necessary to use smaller ink droplets and prevent the ink droplets attached to the recording layer from expanding. In particular, the prevention of bleeding of dye due to the expansion of ink droplets is limited so far as it relies mainly on the improvement of the recording layer. It has thus been desired to provide a means of inhibiting the bleeding of dye contained in the ink solution by using improvements in the ink composition and the drawing method.

As yellow dyes for inkjet recording there have heretofore been widely known direct azo dyes, acidic azo dyes, etc.

Techniques involving the use of C. I. Acid Yellow 17, C. I. Acid Yellow 23 and C. I. Acid Yellow 26 as acidic azo dye and C. I. Direct Yellow 86, C. I. Direct Yellow 120, C. I. Direct Yellow 132, etc. as direct azo dye in yellow inks for inkjet recording are disclosed in Patent References 1 and 2.

The dye of the invention is superior to these dyes with respect to fastness. Techniques involving the use of the dye of the invention as a yellow ink for inkjet recording are disclosed in Patent Reference 3, Japanese Patent Application Nos. 2002-131536, 2002-124832 and 2002-211683.

As a means of inhibiting the bleeding of dye by improving the ink solution, a method involving the rise of the viscosity of the ink solution, a method involving the use of a low dispersibility particulate coloring material, a method involving the incorporation of a mordant, etc. have been attempted. However, these methods cannot inhibit image bleeding, se-cure the age stability of the ink solution and prevent the clogging of the drawing nozzle at the same time.

[Patent Reference 1]
  JP-A-55-150396

[Patent Reference 2]
  JP-A-2001-240781

[Patent Reference 3]
  JP-A-2001-279145

SUMMARY OF THE INVENTION

In the light of these circumstances, an aim of the invention is to provide an inkjet recording ink which exhibits an excellent weathering resistance and a god hue and an improved bleeding around fine lines and pixels on the inkjet-recorded image and thus gives a recorded image having an excellent quality.

The aim of the invention is accomplished with the following inkjet recording yellow ink.

Item 1) An inkjet recording ink comprising at least one dye dissolved and/or dispersed in an aqueous medium, the dye having a maximum absorption spectrum $\lambda$max at a wavelength range of from 390 nm to 470 nm and a I($\lambda$max+70 nm)/I($\lambda$max) ratio of not greater than 0.4 in which I($\lambda$max) is the absorbance at $\lambda$max and I($\lambda$max+70 nm) is the absorbance at $\lambda$max+70 nm, wherein the inkjet recording ink exhibits an accelerated fading rate constant of not greater than $5.0 \times 10^{-2}$ [hour$^{-1}$] and comprises water-miscible organic solvent(s) incorporated therein, the accelerated fading rate constant being determined by printing the ink on a reflection medium to prepare a printed matter, measuring a reflection density through a status A filter to define an initial value of reflection density ($D_B$) in the yellow region by one point between 0.90 and 1.10, and forcedly (acceleratedly) fading the printed matter by using an ozone discoloration (fading) tester capable of always generating 5 ppm of ozone, so as to define the fading rate constant from the time required until the reflection density reaches 80% of the initial value, the water-miscible organic solvents meeting either of the following requirements (1) and (2):

(1) All the water-miscible organic solvents have a solubility of the dye of less than 10 (g/100 g) at 25° C.; and (2) At least one of the water-miscible organic solvents has a solubility of the dye of not smaller than 10 (g/100 g) at 25° C., with the proviso that the sum of the amount of the water-miscible organic solvents having a solubility of the dye of not smaller than 10 (g/100 g) at 25° C. is not greater than 10% of the weight of the ink;

Item 2) The inkjet recording ink as defined in Item 1), wherein the dye exhibits a $\lambda$max at a wavelength range of from 390 nm to 470 nm and a I($\lambda$max+70 nm)/I($\lambda$max) ratio of not greater than 0.2 in which I(λmax) is the absorbance at λmax and I(λmax+70 nm) is the absorbance at λmax+70 nm.

Item 3) The inkjet recording ink as defined in Item 1) or 2), wherein the dye has an oxidation potential of more positive than 1.0 V (vs SCE).

Item 4) An inkjet recording ink comprising at least a dye dissolved and/or dispersed therein, the dye being a compound represented by the following general formula (1) which has a λmax at a wavelength range of from 390 nm to 470 nm, wherein the inkjet recording ink water-miscible organic solvent(s) incorporated therein, the water-miscible organic solvents meeting either of the following requirements (1) and (2):

(1) All the water-miscible organic solvents have a solubility of the dye of less than 10 (g/100 g) at 25° C.; and
(2) At least one of the water-miscible organic solvents has a solubility of the dye of not smaller than 10 (g/100 g) at 25° C., with the proviso that the sum of the amount of the water-miscible organic solvents having a solubility of the dye of not smaller than 10 (g/100 g) at 25° C. is not greater than 10% of the weight of the ink;

$$A-N=N-B \quad (1)$$

wherein A and B each independently represent a heterocyclic group which may be substituted.

Item 5) The inkjet recording ink as defined in any one of Items 1) to 4), comprising at least two water-miscible organic solvents having a solubility of the dye of not smaller than 10 (g/100 g) at 25° C.

DETAILED DESCRIPTION OF THE INVENTION

The invention will be further described hereinafter.

From the standpoint of fastness to ozone gas, the yellow dye to be used in the invention is controlled to have an accelerated fading rate constant (k) of not greater than $5.0 \times 10^{-2}$ [hour$^{-1}$], preferably not greater than $3.0 \times 10^{-2}$ [hour$^{-1}$], more preferably not greater than $1.0 \times 10^{-2}$ [hour$^{-1}$], the accelerated fading rate constant (k) being determined from the time (t) required until the reflection density ($D_B$) measured in the yellow region through a status A filer on a printed matter obtained by printing the ink on a reflection medium reaches 80% of the initial value when the printed matter is forcedly (acceleratedly) subjected to fading using an ozone discoloration (fading) tester capable of always generating 5 ppm of ozone, the initial value of reflection density being defined by one point between 0.90 and 1.10.

The reflection density is measured through a status A filter (blue) using a reflection densitometer (X-Rite310TR). The accelerated fading rate constant is determined from percent remaining ($=e^{-kt}$), i.e., $-\ln 0.8/t = k$.

The yellow dye preferably has an oxidation potential of more positive than 1.0 V (vs SCE), more preferably more positive than 1.1 V (vs SCE), particularly more positive than 1.15 V (vs SCE). Referring to the kind of the dye, an azo dye satisfying the aforementioned requirements is particularly desirable.

The value of oxidation potential (Eox) can be easily measured by those skilled in the art. For the details of this method, reference can be made to P. Delahay, "New Instrumental Methods in Electrochemistry", Interscience Publishers, 1954, A. J. Bard et al., "Electrochemical Methods", John Wiley & Sons, 1980, and Akiya Fujishima et al, "Denki Kagaku Sokuteiho (Electrochemical Measurement Methods)", Gihodo Publishers, 1984.

In some detail, for the measurement of oxidation potential, the test specimen is dissolved in a solvent such as dimethyl formamide and acetonitrile containing a supporting electrolyte such as sodium perchlorate and tetrapropylammonium perchlorate in a concentration of from $1 \times 10^{-4}$ to $1 \times 10^{-6}$ mol/l. The solution is then measured for oxidation potential with respect to SCE (saturated calomel electrode) by cyclic voltametry or DC polarography, etc. This value may deviate by a few tens of millivolts when affected by the difference in potential between liquids or the resistivity of sample solution, but the reproducibility of potential can be assured by putting a standard sample (e.g., hydroquinone) in the sample solution.

In order to unequivocally define oxidation potential, in the present invention, the value (vs SCE) measured in dimethyl formamide containing 0.1 mol dm$^{-3}$ of tetrapropylammonium perchlorate as a supporting electrolyte (dye concentration: 0.001 mol dm$^{-3}$) is defined as oxidation potential of dye.

The value of Eox (oxidation potential) represents the transferability of electron from the sample to the electrode. The greater the value of Eox is (the more positive the oxidation potential is), the more difficult transfer of electrons from the sample to the electrode, is that is, the sample is more difficult to oxidize. Referring to the relation with the structure of the compound, the oxidation potential is made more positive by incorporating an electron-withdrawing group and more negative by incorporating an electron-donating group. In the present invention, in order to reduce the reactivity with ozone, which is an electrophilic agent, it is desired that the oxidation potential be made more positive by incorporating an electron-withdrawing group in the yellow dye skeleton.

It is also desired that the dye to be used in the invention exhibits a good fastness as well as a good hue, and it is particularly desired that the dye shows a sharp absorption spectrum on the long wavelength side. To this end, the dye to be used in the invention preferably is a yellow dye having a λmax at a wavelength range of from 390 nm to 470 nm and a I(λmax+70 nm)/I(λmax) ratio of not greater than 0.2, more preferably not greater than 0.1 in which I(λmax) is the absorbance at λmax and I(λmax+70 nm) is the absorbance at λmax+70 nm. Ideally speaking, the lower limit of the ratio is 0. In actuality, however, the lower limit of the ratio is about 0.01.

As such a dye satisfying the aforementioned requirements for oxidation potential and absorption characteristics there is preferably used one represented by the following general formula (1). However, the compound represented by the general formula (1) merely has to have a λmax at a wavelength range of from 390 nm to 470 nm but doesn't necessarily satisfy the requirement for I(λmax+70 n)/I(λmax) ratio. The yellow dye defined in Item 1 and the yellow dye represented by the general formula (1) defined in Item 4 are generically referred to as "yellow dye of the invention".

$$A-N=N-B \tag{1}$$

wherein A and B each independently represent a heterocyclic group which may be substituted.

As the heterocyclic group there is preferably used one formed by 5- or 6-membered rings. The heterocyclic group may have a monocyclic structure or a polycyclic structure formed by condensing two or more rings. The heterocyclic group may be either an aromatic heterocyclic group or a non-aromatic heterocyclic group. Preferred examples of the hetero atoms constituting the aforementioned heterocyclic group include N, O and S atoms.

Preferred examples of the heterocyclic group represented by A in the aforementioned general formula (1) include 5-pyrazolone, pyrazole, triazole, oxazolone, isoxazolone, barbituric acid, pyridone, pyridine, rhodanine, pyrazolidinedione, pyrazolopyridone, Meldrum's acid, and condensed heterocyclic group having aromatic hydrocarbon rings or heterocyclic rings condensed to these heterocyclic rings. Preferred among these heterocyclic groups are 5-pyrazolone, 5-aminopryrazole, pyridone, 2,6-diaminopyridine, and pyrazoloazole, particularly 5-aminopryrazole, 2-hydroxy-6-pyridone, and pyrazolotriazole.

Examples of the heterocyclic group represented by B include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzoimidazole, triazole, oxazole, isoxazole, benzoxazole, thiazole, benzothiazole, isothiazole, benzoisothiazole, thiadiazole, benzoisoxazole, pyrrolidine, piperidine, piperadine, imidazolidine, and thiazoline. Preferred among these heterocyclic groups are pyridine, quinoline, thiophene, benzothiophene, pyrazole, imidazole, benzoimidazole, triazole, oxazole, isoxazole, benzoxazole, thiazole, benzothiazole, isothiazole, benzoisothiazole, thiadiazole, and benzoisoxazole. More desirable among these heterocyclic groups are quinoline, thiophene, pyrazole, thiazole, benzoxazole, benzoisoxazole, isothiazole, imidazole, benzothiazole, and thiadiazole. Particularly preferred among these heterocyclic groups are pyrazole, benzothiazole, benzoxazole, imidazole, 1,2,4-thiadiazole, and 1,3,4-thiadiazole.

Examples of the substituents on A and B include halogen atoms, alkyl groups, cycloalkyl groups, aralkyl groups, alkenyl groups, alkynyl groups, aryl groups, heterocyclic groups, cyano groups, hydroxyl groups, nitro groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, imido groups, phosphino groups, phosphinyl groups, phosphinyloxy groups, phosphinylamino groups, silyl groups, and ionically hydrophilic groups.

The dye of the general formula (1), if used as a water-soluble dye, preferably has at least one ionically hydrophilic group per molecule. Examples of the ionically hydrophilic group include sulfo groups, carboxyl groups, phosphono groups, and quaternary ammonium groups. Preferred among these ionically hydrophilic groups are carboxyl groups, phosphono groups, and sulfo groups. Particularly preferred among these ionically hydrophilic groups are carboxyl groups and sulfo groups. The carboxyl groups, phosphono groups and sulfo groups maybe in the form of salt. Examples of the counter ion forming the salt include ammonium ions, alkaline metal ions (e.g., lithium ion, sodium ion, potassium ion), and organic cations (e.g., tetramethylammonium ion, tetramethylguanidium ion, tetramethylphosphonium). Preferred among these counter ions are alkaline metal salts.

Preferred among the dyes represented by the general formula (1) are those represented by the following general formulae (2), (3) and (4).

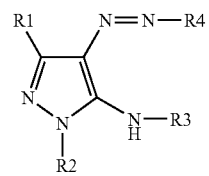

(2)

wherein $R^1$ and $R^3$ each represent a hydrogen atom, cyano group, alkyl group, cycloalkyl group, aralkyl group, alkoxy group, alkylthio group, arylthio group, aryl group or ionically hydrophilic group; $R^2$ represents a hydrogen atom, alkyl group, cycloalkyl group, aralkyl group, carbamoyl group, acyl group, aryl group or heterocyclic group; and $R^4$ represents a heterocyclic group.

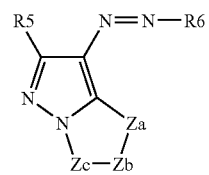

(3)

wherein $R^5$ represents a hydrogen atom, cyano group, alkyl group, cycloalkyl group, aralkyl group, alkoxy group, alkylthio group, arylthio group, aryl group or ionically hydrophilic group; Za represents —N=, —NH— or —C($R^{11}$); Zb and Zc each independently represent —N= or —C($R^{11}$) in which $R^{11}$ represents a hydrogen atom or nonmetallic substituent; and $R^6$ represents a heterocyclic group.

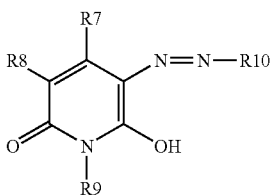

(4)

wherein $R^7$ and $R^9$ each independently represent a hydrogen atom, cyano group, alkyl group, cycloalkyl group, aralkyl group, aryl group, alkylthio group, arylthio group, alkoxycarbonyl group, carbamoyl group or ionically hydrophilic group; R8 represents a hydrogen atom, halogen atom, alkyl group, alkoxy group, aryl group, aryloxy group, cyano group, acylamino group, sulfonylamino group, alkoxycarbonylamino group, ureido group, alkylthio group, arylthio group, alkoxycarbonyl group, carbamoyl group, sulfamoyl group, alkylsulfonyl group, arylsulfonyl group, acyl group, amino group, hydroxyl group or ionically hydrophilic group; and $R^{10}$ represents a heterocyclic group.

Examples of the alkyl groups represented by $R^1$, $R^2$, $R^3$, $R^5$, $R^7$, $R^8$ and $R^9$ in the general formulae (2), (3) and (4) include substituted and unsubstituted alkyl groups. The aforementioned alkyl groups each preferably have from 1 to 20 carbon atoms. Examples of the substituents on these alkyl groups include hydroxyl groups, alkoxy groups, cyano groups, halogen atoms, and ionically hydrophilic groups. Examples of the aforementioned alkyl groups include methyl, ethyl, butyl, isopropyl, t-butyl, hydroxyethyl, methoxyethyl, cyanoethyl, trifluoromethyl, 3-sulfopropyl, and 4-sulfobutyl.

Examples of the cycloalkyl groups represented by $R^1$, $R^2$, $R^3$, $R^5$, $R^7$, $R^8$ and $R^9$ include substituted and unsubstituted cycloalkyl groups. The aforementioned cycloalkyl groups each preferably have from 5 to 12 carbon atoms. Examples of the substituents on these cycloalkyl groups include ionically hydrophilic groups. Examples of the aforementioned cycloalkyl groups include cyclohexyl groups.

Examples of the aralkyl groups represented by $R^1$, $R^2$, $R^3$, $R^5$, $R^7$, $R^8$ and $R^9$ include substituted and unsubstituted aralkyl groups. The aforementioned aralkyl groups each preferably have from 7 to 20 carbon atoms. Examples of the substituents on these aralkyl groups include ionically hydrophilic groups. Examples of the aforementioned aralkyl groups include benzyl and 2-phenethyl groups.

Examples of the aryl groups represented by $R^1$, $R^2$, $R^3$, $R^5$, $R^7$, $R^8$ and $R^9$ include substituted and unsubstituted aryl groups. The aforementioned aryl groups each preferably have from 6 to 20 carbon atoms. Examples of the substituents on these aryl groups include alkyl groups, alkoxy groups, halogen atoms, alkylamino groups, and ionically hydrophilic groups. Examples of the aforementioned aryl groups include phenyl, p-tollyl, p-methoxyphenyl, o-chlorophenyl, and m-(3-sulfopropylamino)phenyl groups.

Examples of the alkylthio groups represented by $R^1$, $R^2$, $R^3$, $R^5$, $R^7$, $R^8$ and $R^9$ include substituted and unsubstituted alkylthio groups. The aforementioned alkylthio groups each preferably have from 1 to 20 carbon atoms. Examples of the substituents on these alkylthio groups include ionically hydrophilic groups. Examples of the aforementioned alkylthio groups include methylthio and ethylthio groups.

Examples of the arylthio groups represented by $R^1$, $R^2$, $R^3$, $R^5$, $R^7$, $R^8$ and $R^9$ include substituted and unsubstituted arylthio groups. The aforementioned arylthio groups each preferably have from 6 to 20 carbon atoms. Examples of the substituents on these arylthio groups include alkyl groups, and ionically hydrophilic groups. Examples of the aforementioned arylthio groups include phenylthio and p-tollylthio groups.

The heterocyclic group represented by $R^2$ ($R^{22}$ described later) is preferably a 5- or 6-membered heterocyclic group which may be further condensed. Preferred examples of the hetero atoms constituting the heterocyclic group include N, S and O atoms. The heterocyclic group represented by $R^2$ may be either an aromatic heterocyclic group or a nonaromatic heterocyclic group. The aforementioned heterocyclic group may be further substituted. Examples of the substituents on these heterocyclic groups include those listed later with reference to the aryl group. The aforementioned heterocyclic group is preferably a 6-membered nitrogen-containing aromatic heterocyclic group, particularly triazine, pyrimidine, phthaladine.

Examples of the halogen atom represented by $R^8$ include fluorine atom, chlorine atom, and bromine atom.

Examples of the alkoxy groups represented by $R^1$, $R^3$, $R^5$ and $R^8$ include substituted and unsubstituted alkoxy groups. The aforementioned alkoxy groups each preferably have from 1 to 20 carbon atoms. Examples of the substituents on these alkoxy groups include hydroxyl group and ionically hydrophilic groups. Examples of the aforementioned alkoxy groups include methoxy, ethoxy, isopropoxy, methoxyethoxy, hydroxyethoxy, and 3-carboxypropoxy.

Examples of the aryloxy group represented by $R^8$ include substituted and unsubstituted aryloxy groups. The aforementioned aryloxy groups each preferably have from 6 to 20 carbon atoms. Examples of the substituents on these aryloxy groups include alkoxy group and tonically hydrophilic group. Examples of the aforementioned aryloxy groups include phenoxy, p-methoxyphenoxy and o-methoxyphenoxy groups.

Examples of the acrylamino groups represented by $R^8$ include substituted and unsubstituted acylamino groups. The aforementioned acylamino groups each preferably have from 2 to 20 carbon atoms. Examples of the substituents on these acylamino groups include ionically hydrophilic groups. Examples of the aforementioned acylamino groups include acetamide, propionamide, benzamide and 3,5-disulfobenzamide groups.

Examples of the sulfonylamino group represented by $R^8$ include substituted and unsubstituted sulfonylamino groups. The aforementioned sulfonylamino groups each preferably have from 1 to 20 carbon atoms. Examples of the aforementioned sulfonylamino groups include methylsulfonylamino and ethylsulfonylamino groups.

Examples of the alkoxycarbonylamino group represented by $R^8$ include substituted and unsubstituted alkoxycarbonylamino groups. The aforementioned alkoxycarbonylamino groups each preferably have from 2 to 20 carbon atoms.

Examples of the substituents on these alkoxycarbonylamino groups include tonically hydrophilic groups. Examples of the aforementioned alkoxycarbonylamino groups include ethoxycarbonylamino group.

Examples of the ureido group represented by $R^8$ include substituted and unsubstituted ureido groups. The aforementioned ureido groups each preferably have from 1 to 20 carbon atoms. Examples of the substituents on these ureido groups include alkyl group and aryl group. Examples of the aforementioned ureido groups include 3-methylureido, 3,3-dimethylureide and 3-phenylureido groups.

Examples of the alkoxycarbonyl groups represented by $R^7$, $R^8$ and $R^9$ include substituted and unsubstituted alkoxycarbonyl groups. The aforementioned alkoxycarbonyl groups each preferably have from 2 to 20 carbon atoms. Examples of the substituents on these alkoxycarbonyl groups include tonically hydrophilic groups. Examples of the aforementioned alkoxycarbonyl groups include methoxycarbonyl and ethoxycarbonyl groups.

Examples of the carbamoyl groups represented by $R^2$, $R^7$, $R^8$ and $R^9$ include substituted and unsubstituted carbamoyl groups. Examples of the substituents on these carbamoyl groups include alkyl groups. Examples of the aforementioned carbamoyl groups include methylcarbamoyl group and dimethylcarbamoyl group.

Examples of the sulfamoyl represented by $R^8$ include substituted and unsubstituted sulfamoyl groups. Examples of the substituents on these sulfamoyl groups include alkyl groups. Examples of the aforementioned sulfamoyl groups include dimethylsulfamoyl group and di-(2-hydroxyethyl)sulfamoyl group.

Examples of the alkylsulfonyl and arylsulfonyl groups represented by $R^8$ include methylsulfonyl and phenylsulfonyl groups.

Examples of the acyl groups represented by $R^2$ and $R^8$ include substituted and unsubstituted acyl groups. The aforementioned acyl groups each preferably have from 1 to 20 carbon atoms. Examples of the substituents on these acyl groups include ionically hydrophilic groups. Examples of the aforementioned acyl groups include acetyl and benzoyl groups.

Examples of the amino group represented by $R^8$ include substituted and unsubstituted amino groups. Examples of the substituents on these amino groups include alkyl group, aryl group and heterocyclic group. Examples of the aforementioned amino groups include methylamino, diethylamino, anilino and 2-chloroanilino groups.

The heterocyclic group represented by $R^4$, $R^6$ or $R^{10}$ is the same as the heterocyclic group represented by B in the general formula (1) which maybe substituted. Preferred examples, more desirable examples and particularly preferred examples of the heterocyclic group are the same as previously described. Examples of the substituents on the heterocyclic group include ionically hydrophilic groups, alkyl groups having from 1 to 12 carbon atoms, aryl groups, alkylthio groups, arylthio groups, halogen atoms, cyano groups, sulfamoyl groups, sulfonamide groups, carbamoyl groups, and acylamino groups. These alkyl and aryl groups and other groups may further have substituents.

In the aforementioned general formula (3), Za —N=, —NH— or —C($R^{11}$), Zb and Zc each independently represent —N= or —C($R^{11}$) in which $R^{11}$ represents a hydrogen atom or nonmetallic substituent. The nonmetallic substituent represented by $R^{11}$ is preferably a cyano group, cycloalkyl group, aralkyl group, aryl group, alkylthio group, arylthio group or ionically hydrophilic group. These substituents have the same meaning as the substituents represented by $R^1$. Preferred examples of these substituents include those listed with reference to $R^1$. Examples of the skeleton of heterocyclic group formed by two 5-membered rings contained in the general formula (3) will be given below.

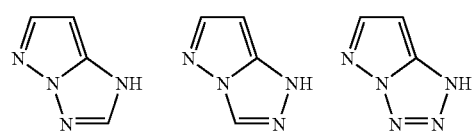

Examples of the substituents on the aforementioned substituents which may further have substituents include substituents which may substitute the heterocyclic groups A and B in the general formula (1).

The dyes represented by the general formulae (2) to (4), if used as a water-soluble dye, each preferably have at least one ionically hydrophilic group per molecule. Besides dyes of the general formulae (2) to (4) wherein at least any of $R^1$, $R^2$, $R^3$, $R^5$, $R^7$, $R^8$ and $R^9$ is an tonically hydrophilic group, those of the general formulae (2) to (4) wherein $R^1$ to $R^{11}$ further have ionically hydrophilic groups as substituents are included.

Preferred among the dyes of the general formulae (2), (3) and (4) are those of the general formula (2). In particular, those represented by the following general formula (2-1) are preferred.

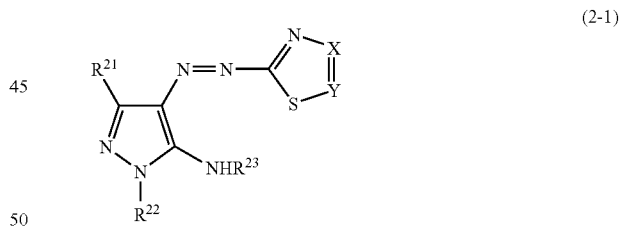

(2-1)

wherein $R^{21}$ and $R^{23}$ each represent a hydrogen atom, alkyl group, cycloalkyl group, aralkyl group, alkoxy group or aryl group; $R^{22}$ represents an aryl group or heterocyclic group; one of X and Y represents a nitrogen atom and the other represents —$CR^{24}$ in which $R^{24}$ represents a hydrogen atom, halogen atom, cyano group, alkyl group, alkylthio group, alkylsulfonyl group, alkylsulfinyl group, alkyloxycarbonyl group, carbamoyl group, alkoxy group, aryl group, arylthio group, arylsulfonyl group, arylsulfinyl group, aryloxy group or acylamino group; and these substituents may be further substituted.

Specific preferred examples of the dye to be used in the invention will be given below, but the invention is not limited thereto. For the details of the synthesis of these compounds, reference can be made to JP-A-2-24191, JP-A-2001-279145 and Japanese Patent Application No. 2002-124832.
I-1
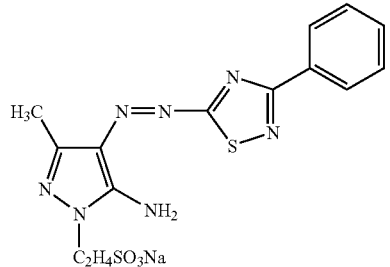
I-2
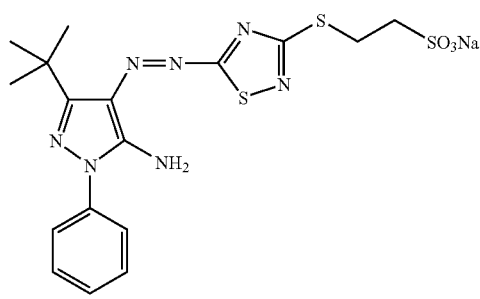
I-3
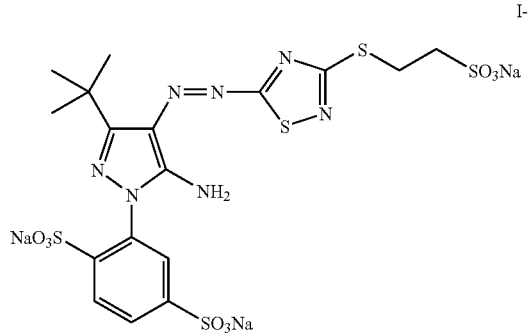
I-4
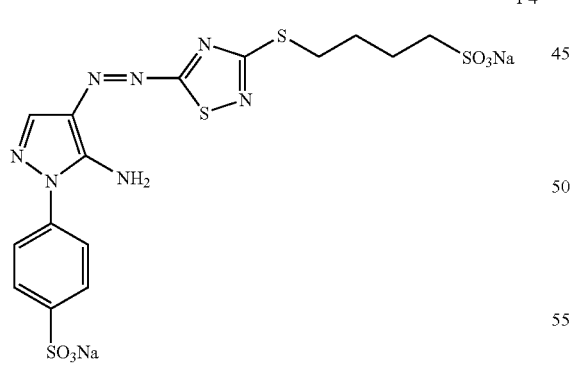
I-5
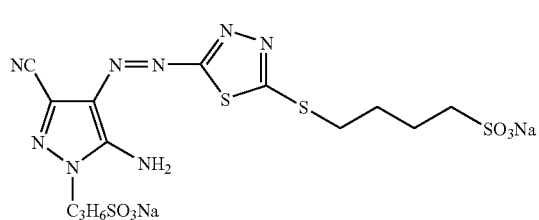
-continued
I-6
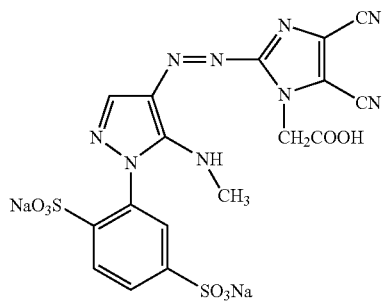
I-7
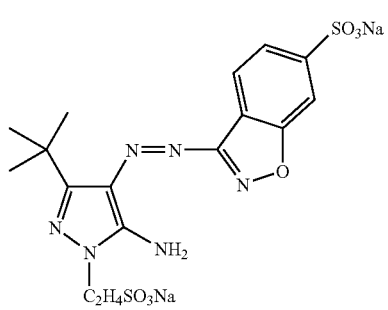
I-8
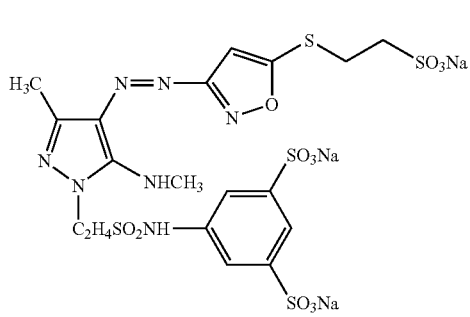
I-9
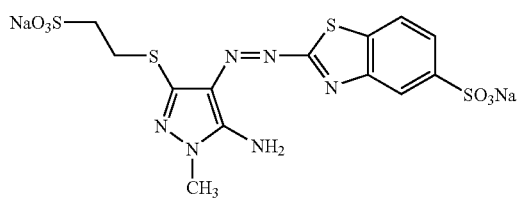
I-10
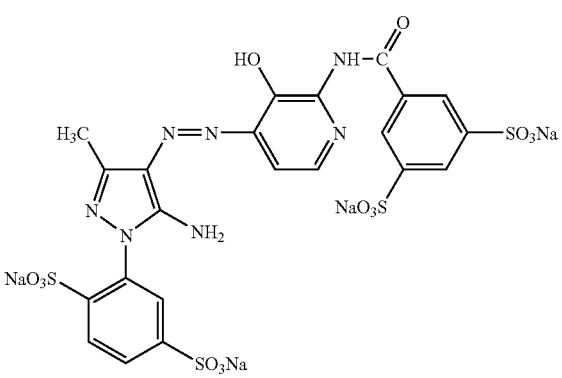

-continued
I-11
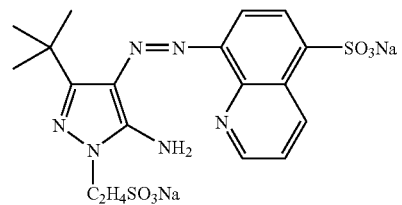
I-12
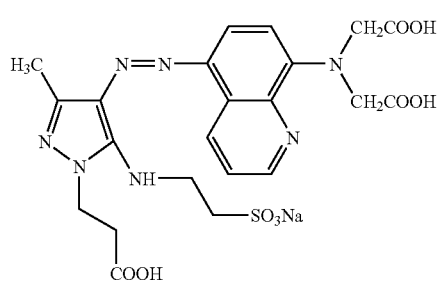
I-13
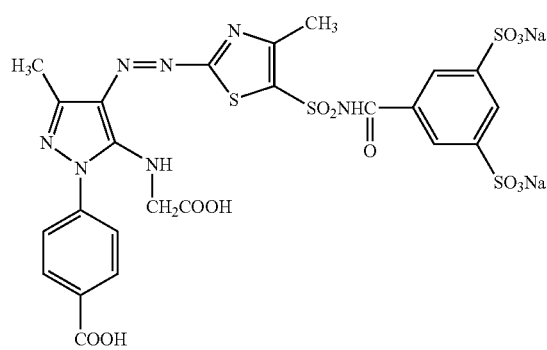
I-14
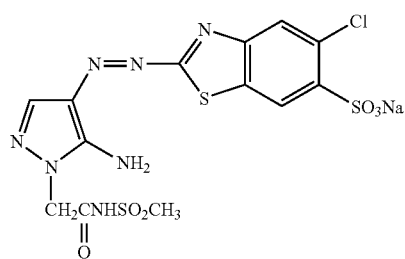
I-15
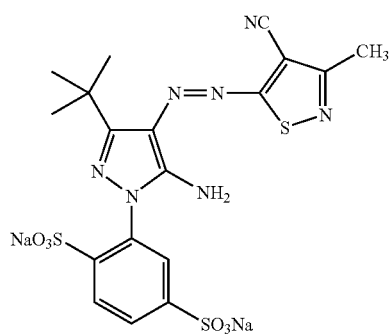
-continued
I-16
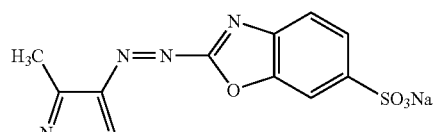
I-17
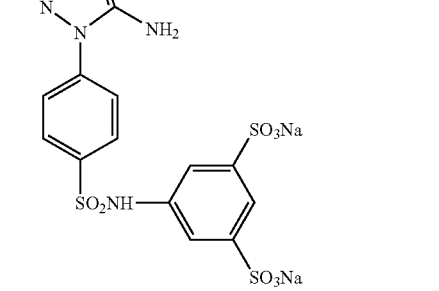
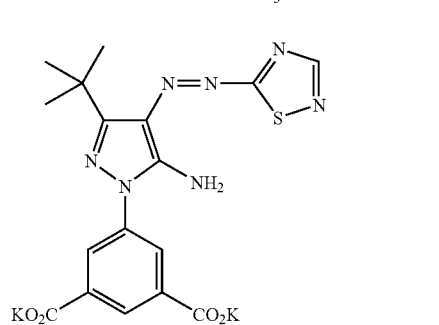
| DYE | R |
|---|---|
| I-18 | CH₃ |
| I-19 | C₃H₆SO₃Na |
| I-20 | H |
| I-21 | C₂H₄CN |
| I-22 | 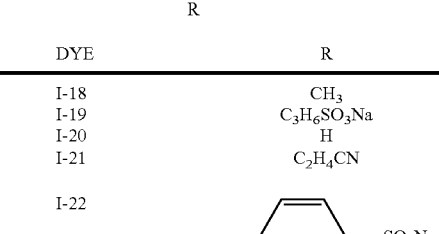 |
| I-23 | 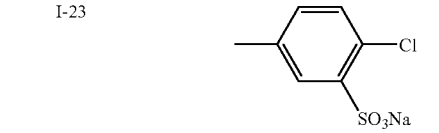 |
| I-24 | 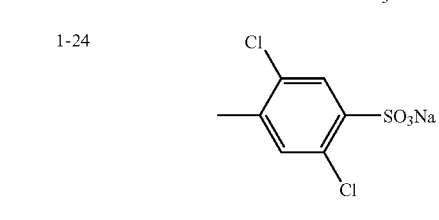 |

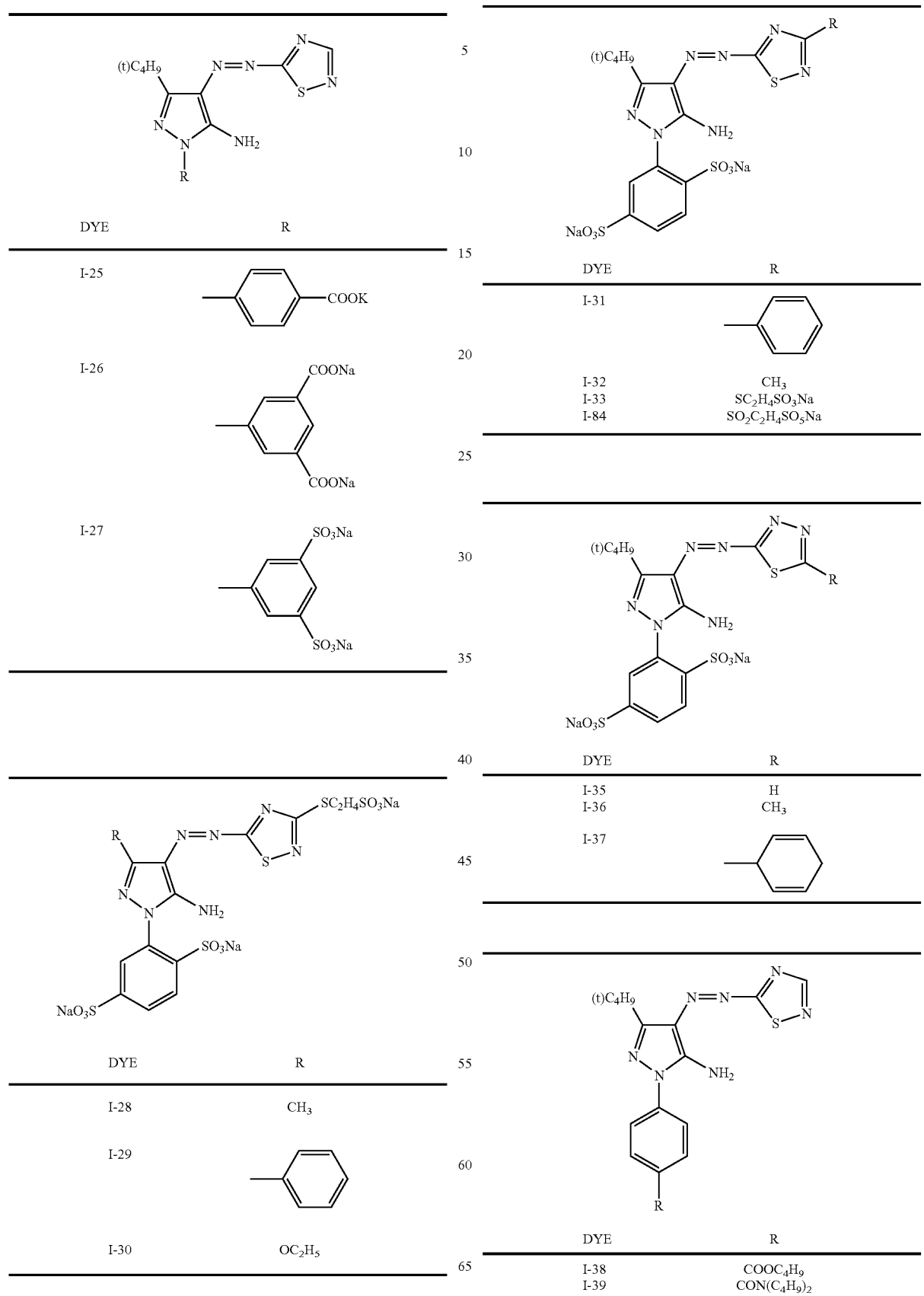

-continued
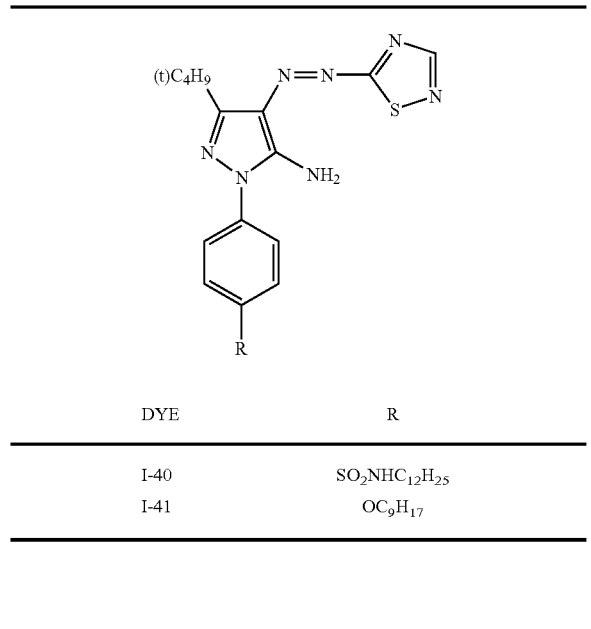
| DYE | R |
|---|---|
| I-40 | SO$_2$NHC$_{12}$H$_{25}$ |
| I-41 | OC$_9$H$_{17}$ |
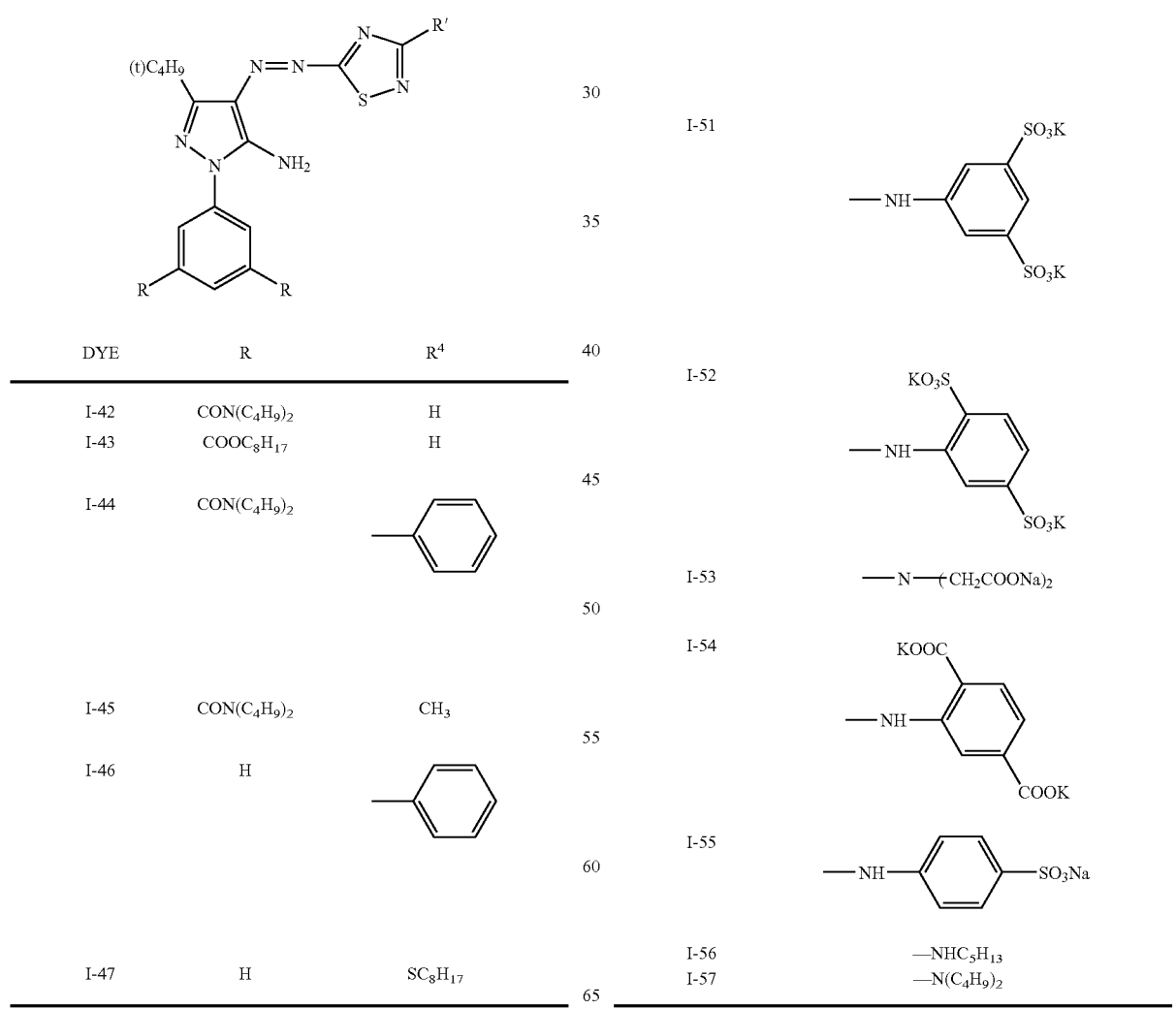
| DYE | R | R$^4$ |
|---|---|---|
| I-42 | CON(C$_4$H$_9$)$_2$ | H |
| I-43 | COOC$_8$H$_{17}$ | H |
| I-44 | CON(C$_4$H$_9$)$_2$ | — |
| I-45 | CON(C$_4$H$_9$)$_2$ | CH$_3$ |
| I-46 | H | — |
| I-47 | H | SC$_8$H$_{17}$ |
| DYE | R |
|---|---|
| I-48 | —NHC$_2$H$_4$COOK |
| I-49 | —NHC$_2$H$_4$SO$_3$Na |
| I-50 | —NH-C$_6$H$_3$(COOK)$_2$ |
| I-51 | —NH-C$_6$H$_3$(SO$_3$K)$_2$ |
| I-52 | —NH-C$_6$H$_3$(SO$_3$K)(SO$_3$K) |
| I-53 | —N(CH$_2$COONa)$_2$ |
| I-54 | —NH-C$_6$H$_3$(COOK)(COOK) |
| I-55 | —NH-C$_6$H$_4$-SO$_3$Na |
| I-56 | —NHC$_5$H$_{13}$ |
| I-57 | —N(C$_4$H$_9$)$_2$ |

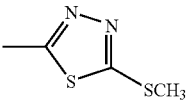
| DYE | Ar |
|---|---|
| I-58 | 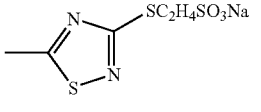 |
| I-59 | 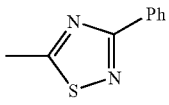 |
| I-60 | 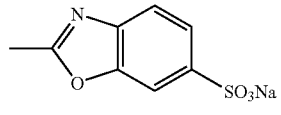 |
| I-61 | 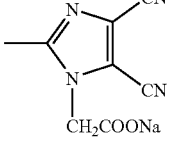 |
| I-62 | 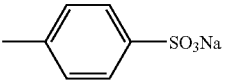 |
| I-63 | 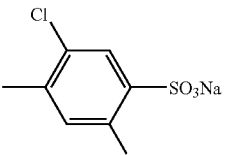 |
| I-64 | 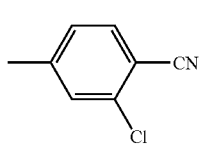 |
| I-65 | 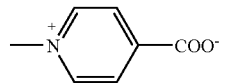 |
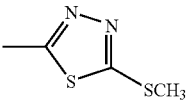
| DYE | R | R' |
|---|---|---|
| I-66 | Ph | H |
| I-67 | OC$_2$H$_5$ | C$_2$H$_5$ |
| I-68 | CH$_3$ | H |
| I-69 | t-C$_4$H$_9$ | H |
| I-70 | t-C$_4$H$_9$ | —C$_2$H$_4$COOH |
DYE I-71
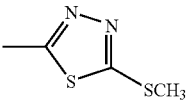
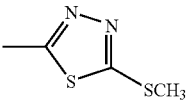
| DYE | R |
|---|---|
| I-72 | H |
| I-73 | OCH$_3$ |
| I-74 | OH |
| I-75 | SO$_3$Na |
| I-76 | F |
| I-77 | 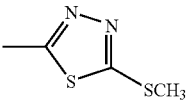 |

| DYE | R¹ | R² | R³ |
|---|---|---|---|
| I-78 | Cl | Cl | Cl |
| I-79 | Cl | Cl | F |
| I-80 | Cl | —CONHPh | Cl |

| DYE | R¹ | R² | R³ |
|---|---|---|---|
| I-81 | F | H | H |
| I-82 | Cl | H | F |

| DYE | R¹ | R² | R³ |
|---|---|---|---|
| I-83 | H | F | F |
| I-84 | F | F | H |

| DYE | R |
|---|---|
| I-85 | H |
| I-86 | $CH_3$ |
| I-87 | Ph |
| I-88 | $SCH_2COONa$ |
| I-89 | $SC_2H_5$ |
| I-90 | $SC_4H_9$-n |
| I-91 | $SCH_2CHMe_2$ |
| I-92 | SCHMeEt |
| I-93 | $SC_4H_9$-t |
| I-94 | $SC_7H_{15}$-n |
| I-95 | $SC_2H_4OC_2H_5$ |
| I-96 | $SC_2H_4OC_4H_9$-n |
| I-97 | $SCH_2CF_3$ |

| DYE | R |
|---|---|
| I-98 | $—NHC_2H_4COOK$ |
| I-99 | $—NHC_2H_4SO_3Na$ |
| I-100 | —NH—C₆H₃(COOK)₂ |
| I-101 | —NH—C₆H₃(SO₃K)₂ |

-continued

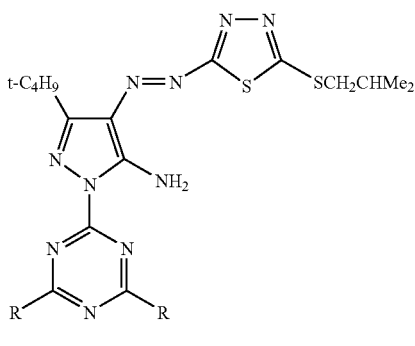

| DYE | R |
|---|---|
| I-102 | 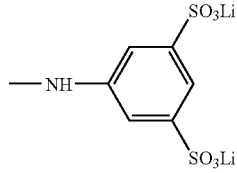 |
| I-103 | 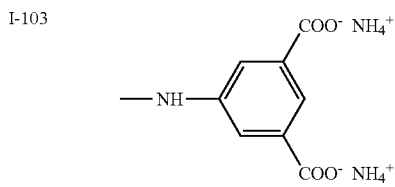 |
| I-104 | —NHC$_6$H$_{13}$-n |
| I-105 | —N(C$_4$H$_9$-n)$_2$ |
| I-106 |  |
| I-107 | 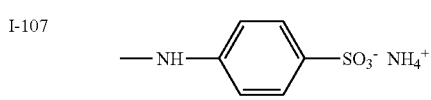 |
| I-108 | 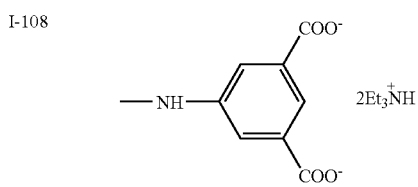 |

The inkjet recording ink of the invention (also referred to as "ink of the invention") preferably comprises the yellow dye of the invention incorporated therein in an amount of from 0.2 to 20% by weight, more preferably from 0.5 to 15% by weight. On the other hand, in the case where other dyes are used as so-called light ink having a lower dye concentration in combination with the ink of the invention in the ink set, the resulting ink preferably has a weight concentration of from 1/20 to 1/2, more preferably from 1/10 to 3/7 of the aforementioned dye concentration. In this arrangement, an ink set comprising the ink of the invention and an ink having an absorbance of from 1/20 to 1/2, preferably from 1/10 to 3/7 of that of the ink of the invention can be formed. Thus, the quality of the gradation of fine image portions can be improved. Further, in the case where a plurality of dyes are used in admixture, it is not necessarily required that the main ink and the light ink have the same combination of dyes or the same composition ratio of dyes. For the measurement of the absorbance of the ink, the ink is diluted with purified water 10,000 times. The diluted ink is then measured for absorbance at a wavelength of 10 nm lower and higher than the absorption peak of the dye using a spectrophotometer. The two measurements are then averaged.

The ink of the invention comprises water-miscible organic solvents meeting either of the following requirements (1) and (2):

(1) All the water-miscible organic solvents have a solubility of the yellow dye of less than 10 (g/100 g), preferably less than 8 (g/100 g) at 25° C.; and (2) At least one of the water-miscible organic solvents has a solubility of the dye of not smaller than 10 (g/100 g) at 25° C., with the proviso that the sum of the amount of the water-miscible organic solvents having a solubility of the yellow dye of not smaller than 10 (g/100 g) at 25° C. is not greater than 10%, preferably not greater than 8% of the weight of the ink.

In the case (2), it is preferable that the ink of the present invention contains at least one water-miscible organic solvent having a solubility of the dye of less than 10 (g/100 g). The preferable ratio of the total amount of the water-miscible organic solvent(s) having a solubility of the dye of less than 10 (g/100 g) to the total amount of the water-miscible organic solvent(s) having a solubility of the dye of not smaller than 10 (g/100 g) is 1/0 to 1/1.

The ink of the invention comprises water-miscible organic solvents in the aforementioned arrangement, making it possible to effectively inhibit color stain.

The various inks constituting the aforementioned ink set preferably comprise water-miscible (i.e., water-soluble or water-dispersible) organic solvents in the aforementioned arrangement (with the proviso that the yellow dye of the invention is other dye) as in the ink of the invention to advantage from the standpoint of inhibition of color stain on multi-color image.

In the case where there are two or more water-miscible organic solvents having a solubility of the dye of not smaller than 10 contained in the ink set comprising the ink of the invention, the sum of the amount of the two or more water-miscible organic solvents is preferably not greater than 10% of the total weight of the inks.

As the water-miscible organic solvents to be used in the invention, those meeting either of the requirements (1) and (2) can be selected from any known water-miscible solvents. In the aforementioned requirement (2), one or more water-miscible organic solvents having a solubility of the yellow dye of less than 10 (g/100 g) the invention at 25° C. may be included.

Examples of the water-miscible organic solvents employable herein include alcohols, polyvalent alcohols, glycol derivatives, amines, and other polar solvents.

Specific examples of these water-miscible organic solvents include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, thiodiethylene glycol, tetraethylene glycol, 2-butehe-1,4-diol, 1,3-butanediol, 1,5-pentanediol, 1,2-hexanediol, 2-methyl-2,4-pentanediol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, ethylene glycol monoisobutyl ether, diethylene glycol monoisobutyl ether, diethylehe glycol monomethyl ether, diethylene glycol monoethyl ether, diethylene glycol monobutyl ether, propylene glycol monomethyl ether, propylene glycol monobutyl ether, dipropylene glycol monomethyl ether, propylene glycol monopropyl ether, triethylene glycol monomethyl ether, triethylene glycol monobutyl ether, polyethylene glycol monomethyl ether, ethylene glycol diacetate, ethylene glycol monomethyl ether acetate, triethylene glycol monomethyl ether, triethylene glycol monoethyl ether, ethylene glycol monophenyl ether, ethylene glycol monoisopropyl ether, tripropylene glycol monoethyl ether, tripropylene glycol monomethyl ether, diisopylene glycol monomethyl ether), amines (e.g., ethanolamine, diethanolamine, triethanolamine, N-methyl diethanolamine, N-ethyldiethanolamine, morpholine, N-ethylmorpholine, ethylenediamine, diethylenetriamine, triethylenetetramine, polyethyleneimine, tetramethyl propylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidione, acetonitrile, acetone, diacetone alcohol).

Preferred among these water-miscible organic solvents are glycol derivative-based solvents and alcohol-based solvents. The amount of these water-miscible organic solvents to be used is properly selected taking into account various properties such as age stability, ejection stability and anti-clogging properties of the ink. Specifically, these water-miscible organic solvents are preferably incorporated in an amount of from 1 to 60% by weight, more preferably from 5 to 50% by weight based on the total amount of the ink.

The water-miscible organic solvents contribute to the aforementioned properties of the ink of the invention and thus can have the same function as the functional components described later. Therefore, the water-miscible organic solvents maybe included in the functional components. However, the water-miscible organic solvents need to satisfy the aforementioned requirements (1) and (2) when the mixing proportion described later is used.

The ink of the invention may comprise other dyes incorporated therein in combination with the yellow dye of the invention to adjust the color tone so that a full-color image can be provided. Examples of dyes to be used in combination with the yellow dye of the invention will be given below.

Examples of the yellow dye employable herein include aryl- and heterylazo dyes having phenols, naphthols, anilines, pyrazolones, pyridones or open chain active methylene compounds as coupling components, azomethine dyes having open active chain methylene compounds as coupling components, methine dyes such as benzylidene dye and monomethine oxonol dye, and quinone dyes such as naphthoquinone dye and anthraquinone dye. Other examples of the yellow dye employable herein include quinophthalone dyes, nitro-nitroso dyes, acridine dyes, and acridinone dyes. These dyes assume yellow color only when the chromophore undergoes partial dissociation. The counter cation in this case may be an inorganic cation such as alkaline metal ion and ammonium ion or an organic cation such as pyridinium ion and quaternary ammonium salt ion, even a polymer cation having these cations as partial structure.

Examples of the magenta dye employable herein include aryl- and heterylazo dyes having phenols, naphthols or anilines as coupling components, azomethine dyes having pyrazolones or pyrazolotriazoles as coupling components, methine dyes such as arylidene dye, styryl dye, melocyanine dye and oxonol dye, carbonium dyes such as diphenylmethane dye, triphenylmethane dye and xanthene dye, quinone-based dyes such as naphthoquinone, anthraquinone and anthrapyridone, and condensed polycyclic dyes such as dioxazine dye. These dyes assume magenta color only when the chromophore undergoes partial dissociation. The counter cation in this case may be an inorganic cation such as alkaline metal ion and ammonium ion or an organic cation such as pyridinium ion and quaternary ammonium salt ion, even a polymer cation having these cations as partial structure.

Examples of the cyan dye employable herein include azomethine dyes such as indoaniline dye and indophenol dye, polymethine dyes such as cyanine dye, oxonol dye and melocyanine dye, carbonium dyes such as diphenylmethane dye, triphenylmethane dye and xanthene dye, phthalocyanine dyes, anthraquinone dyes, aryl- and heteryl azo dyes having phenols, napthols or anilines as coupling components, and indigo-thibindigo dyes. These dyes assume cyan color only when the chromophore undergoes partial dissociation. The counter cation in this case may be an inorganic cation such as alkaline metal ion and ammonium ion or an organic cation such as pyridinium ion and quaternary ammonium salt ion, even a polymer cation having these cations as partial structure.

Alternatively, black dyes such as polyazo dye may be used.

Examples of water-soluble dyes include direct dyes, acid dyes, food dyes, basic dyes, and reactive dyes. The following dyes are preferable.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247

C.I. Direct Violet 7, 9, 47, 48, 51, 66, 90, 93, 94, 95, 98, 100, 101

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397

C.I. Acid Violet 5 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326

C.I. Acid Black 7, 24, 29, 48, 52:1, 172

C.I. Reactive Red 3, 13, 17, 19, 21, 22, 23, 24, 29, 35, 37, 40, 41, 43, 45, 49, 55

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 8, 10, 13, 14, 15, 17, 18, 19, 21, 25, 26, 27, 28, 29, 38

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Also, pigments can be used together.

As the pigments that can be used in the invention, commercially available pigments and known pigments described in various literatures can be utilized. Examples of literatures include Color Index, edited by The Society of Dyers and Colourists; Kaitei Shin-Pan Ganryo Binran (Revised New Edition, Pigment Handbook), edited by Nippon Ganryo Gijutsu Kyokai (Japan Pigment Technical Society) (1989); Saishin Ganryo Ohyo Gijutsu (Current Pigment Application Technologies), published by CMC Publishing co., Ltd. (1986); Insatsu Inki Gijutsu (Printing Ink Technologies), published by CMC Publishing Co., Ltd. (1984); and W. Herbst and K. Hunger, Industrial Organic Pigments, published by VCHV Verlagsgesellschaft (1993). Specifically, examples of organic pigments include azo pigments (such as azo lake pigments, insoluble azo pigments, condensed azo pigments, and chelate azo pigments), polycyclic pigments (such as phthalocyanine based pigments, anthraquinone based pigments, perylene based pigments, perinone based pigments, indigo based pigments, quinacridone based pigments, dioxazine based pigments, isoindolinone based pigments, quinophthalone based pigments, and diketopyrrolopyrrole based pigments), dyeing lake pigments (such as lake pigments of acid or basic dyes), and azine pigments; and examples of inorganic pigments include yellow pigments (such as C.I. Pigment Yellow 34, C.I. Pigment Yellow 37, C.I. Pigment Yellow 42, and C.I. Pigment Yellow 53), red pigments (such as C.I. Pigment Red 101 and C.I. Pigment Red 108), blue pigments (such as C.I. Pigment Blue 27, C.I. Pigment Blue 29, and C.I. Pigment Blue 17:1), black pigments (such as C.I. Pigment Black 7 and magnetite), and white pigments (such as C.I. Pigment White 4, C.I. Pigment White 6, C.I. Pigment White 18, and C.I. Pigment White 21).

As pigments having a color tone preferable for image formation, blue or cyan pigments such as phthalocyanine pigments, anthraquinone based indanthrone pigments (such as C.I. Pigment Blue 60), and dyeing lake pigment based triaryl carbonium pigments are preferable; and phthalocyanine pigments (preferred examples include copper phthalocyanines and monochloro or lowly chlorinated copper phthalocyanines such as C.I. Pigment Blue 15:1, C.I. Pigment Blue 15:2, C.I. Pigment Blue 15:3, C.I. Pigment Blue 15:4, and C.I. Pigment Blue 15:6, aluminum phthalocyanines such as pigments described in European Patent No. 860,475, a non-metal phthalocyanine as C.I. Pigment Blue 16, and phthalocyanines having Zn, Ni or Ti as a central metal; and of these pigments, C.I. Pigment Blue 15:3, C.I. Pigment Blue 15:4, and aluminum phthalocyanines are most preferable) are most preferable.

As red or violet pigments, azo pigments (preferred examples include C.I. Pigment Red 3, C.I. Pigment Red 5, C.I. Pigment Red 11, C.I. Pigment Red 22, C.I. Pigment Red 38, C.I. Pigment Red 48:1, C.I. Pigment Red 48:2, C.I. Pigment Red 48:3, C.I. Pigment Red 48:4, C.I. Pigment Red 49:1, C.I. Pigment Red 52:1, C.I. Pigment Red 53:1, C.I. Pigment Red 57;1, C.I. Pigment Red 63:2, C.I. Pigment Red 144, C.I. Pigment Red 146, and C.I. Pigment Red 184; and of these pigments, C.I. Pigment Red 57:1, C.I. Pigment Red 146, and C.I. Pigment Red 184 are most preferable), quinacridone based pigments (preferred examples C.I. Pigment Red 122, C.I. Pigment Red 192, C.I. Pigment Red 202, C.I. Pigment Red 207, C.I. Pigment Red 209, C.I. Pigment Violet 19, and C.I. Pigment Violet 42; and of these pigments, C.I. Pigment 122 is most preferable), dyeing lake based triaryl carbonium pigments (preferred examples of xanthene based C.I. Pigment Red 81:1, C.I. Pigment Violet 1, C.I. Pigment Violet 2, C.I. Pigment Violet 3, C.I. Pigment Violet 27, and C.I. Pigment Violet 39), dioxazine based pigments (such as C.I. Pigment Violet 23 and C.I. Pigment Violet 37), diketopyrrolopyrrole based pigments (such as C.I. Pigment Red 254), perylene pigments (such as C.I. Pigment Violet 29), anthraquinone based pigments (such as C.I. Pigment Violet 5:1, C.I. Pigment Violet 31, and C.I. Pigment Violet 33), and thioindigo based pigments (such as C.I. Pigment Red 38 and C.I. Pigment Red 88) are preferably used.

As yellow pigments, azo pigments (preferred examples include monoazo pigment based C.I. Pigment Yellow 1, C.I. Pigment Yellow 3, C.I. Pigment Yellow 74, and C.I. Pigment Yellow 98, disazo pigment based C.I. Pigment Yellow 12, C.I. Pigment Yellow 13, C.I. Pigment Yellow 14, C.I. Pigment Yellow 16, C.I. Pigment Yellow 17, and C.I. Pigment Yellow 83, overall azo based C.I. Pigment Yellow 93, C.I. Pigment Yellow 94, C.I. Pigment Yellow 95, C.I. Pigment Yellow 128, and C.I. Pigment Yellow 155, and benzimidazolone based C.I. Pigment Yellow 120, C.I. Pigment Yellow 151, C.I. Pigment Yellow 154, C.I. Pigment Yellow 156, and C.I. Pigment Yellow 180; and of these pigments, those free of benzidine based compound as the raw material are most preferable), isoindoline-isoindolinone based pigments (preferred examples include C.I. Pigment Yellow 109, C.I. Pigment Yellow 110, C.I. Pigment Yellow 137, and C.I. Pigment Yellow 139), quinophthalone pigments (preferred examples include C.I. Pigment Yellow 138), and flavanthrone pigments (such as C.I. Pigment Yellow 24) are preferably used.

As black pigments, inorganic pigments (preferred examples include carbon black and magnetite) and Aniline Black can be enumerated as preferred examples.

Besides, orange pigments (such as C.I. Pigment Orange 13 and C.I. Pigment Orange 16) and green pigments (such as C.I. Pigment Green 7) may be used.

The pigments that can be used in the invention may be the above-described naked pigments or surface-treated pigments. As the surface treatment method, there can be considered a method of coating the surface with a resin or a wax, a method of adhering a surface active agent, and a method of binding a reactive substance (such as radicals generated from silane coupling agents, epoxy compounds, polyisocyanates, or diazonium salts) to the pigment surface. These methods are described in the following literatures and patents.

(1) Kinzoku Sekken No Seishitsu To Ohyo (Properties and Applications of Metallic Soaps), published by Saiwai Shobo
(2) Insatsu Inki Gijutsu (Printing Ink Technologies), published by CMC Publishing Co., Ltd. (1984)
(3) Saishin Ganryo Ohyo Gijutsu (Current Pigment Application Technologies), published by CMC Publishing Co., Ltd. (1986)
(4) U.S. Pat. Nos. 5,554,739 and 5,571,311
(5) JP-A-9-151342, JP-A-10-140065, JP-A-10-292143, and JP-A-11-166145

Especially, the self-dispersible pigments prepared by exerting a diazonium salt to carbon black as described in the U.S. patents of the foregoing item (4) and the capsulated pigments prepared by the methods described in the Japanese patents of the foregoing item (5) are especially effective because dispersion stability is obtained without using a superfluous dispersant in the ink.

In the invention, the pigment may be further dispersed using a dispersant. As the dispersant, various known dispersants such as low-molecular weight dispersants of a surface active agent type and high-molecular weight type dispersants can be used depending upon the pigment. Examples of the dispersant include those described in JP-A-3-69949 and European Patent No. 549,486. Also, in using the dispersant, to promoting adsorption of the dispersant onto the pigment, pigment derivatives called a synergist may be added.

The particle size of the pigment that can be used in the invention is preferably in the range of from 0.01 to 10 μm, and more preferably from 0.05 to 1 μm after dispersion.

As a method of dispersing the pigment, known dispersion technologies to be used at the time of ink production or toner production can be employed. Examples of dispersing machines include a vertical or horizontal agitator mill, an attritor, a colloidal mill, a ball mill, a three-roll mill, a pearl mill, a super mill, an impeller, a disperser, a KD mill, a dynatron, and a pressure kneader. The details are described in Saishin Ganryo Ohyo Gijutsu (Current Pigment Application Technologies), published by CMC Publishing co., Ltd. (1986).

The ink of the invention can be prepared by dissolving or dispersing the yellow dye of the invention and preferably a surface active agent in an aqueous medium. The term "aqueous medium" as used herein is meant to indicate water and water-miscible organic solvent optionally comprising other solvents and component such as wetting agent, stabilizer and preservative incorporated therein.

In order to prepare the ink solution of the invention, in the case where the aforementioned dye is water-soluble, it is preferable to first dissolve the dye in water. Thereafter, Various solvents and additives are added, dissolved and mixed to form a uniform ink solution.

At this time, as the dissolution method, Various methods such as dissolution by agitation, dissolution by ultrasonic irradiation, and dissolution by vibration can be used. Of these methods, the agitation is preferably used. In the case of undergoing agitation, various modes that are known in the art, such as fluid-agitation and agitation utilizing a shear force using an inverse agitator or a dissolver can be utilized. On the other hand, an agitation utilizing a shear force against the container bottom by a magnetic stirrer, etc. can be suitably utilized.

By incorporating a surface active agent in the inkjet recording ink of the invention to adjust the physical properties of the ink, the ejection stability of the ink can be improved, making it possible to exert an excellent effect of enhancing the water resistance of the image and preventing the printed ink from bleeding.

Examples of the surface active agent include anionic surface active agents (such as sodium dodecylsulfate, sodium dodecyloxysulfonate, and sodium alkylbenzenesulfonates), cationic surface active agents (such as cetyl pyridinium chloride, trimethylcetylammonium chloride, and tetrabutylammonium chloride), and nonionic surface active agents (such as polyoxyethylene nonylphenyl ether, polyoxyethylene naphthyl ether, and polyoxyethylene octylphenyl ether). Above all, nonionic surface active agents are most preferably used.

The content of the surface active agent is from 0.001 to 20% by weight, preferably from 0.005 to 10% by weight, and more preferably from 0.01 to 5% by weight based on the weight of the ink composition.

In the case where the yellow dye of the invention is an oil-soluble dye, the ink can be prepared by dissolving the oil-soluble dye in a high-boiling organic solvent and emulsifying and dispersing it in the aqueous medium.

The high-boiling organic solvent that is used in the invention has a boiling point of 150° C. or higher, and preferably 170° C. or higher.

Examples of the high-boiling organic solvent employable herein include phthalic acid esters (such as dibutyl phthalate, dioctyl phthalate, dicyclohexyl phthalate, di-2-ethylhexyl phthalate, decyl phthalate, bis(2,4-di-tert-amylphenyl) isophthalate, and bis (1,1-diethylpropyl)phthalate), phosphoric acid or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic acid esters (such as 2-ethylhexyl benzoate, 2,4-dichlorobenzoate, dodecyl benzoate, 2-ethylhexyl-p-hydroxybenzoate), amides (such as N,N-diethyl dodecanamide and N,N-diethyl laurylamide), alcohols or phenols (such as isostearyl alcohol and 2,4-di-tert-amylphenol), aliphatic esters (such as dibutoxyethyl succinate, di-2-ethylhexyl succinate, 2-hexyldecyl tetradecanoate, tributyl citrate, diethyl azelate, isostearyl lactate, and trioctyl citrate), aniline derivatives (such as N,N-dibutyl-2-butoxy-5-tert-octylaniline), chlorinated paraffins (such as paraffins having a chlorine content of from 10% to 80%), trimesic acid esters (such as tributyl trimesate), dodecylbenzene, diisopropylnaphthalene, phenols (such as 2,4-di-tert-amylphenol, 4-dodecyloxyphenol, 4-dodecyloxycarbonylphenol, and 4-(4-dodecyloxyphenylsulfonyl)phenol), carboxylic acids (such as 2-(2,4-di-tert-amylphenoxybutyric acid and 2-ethoxyoctanedecanoic acid), and alkylphosphoric acids (such as di-2-(ethylhexyl) phosphoric acid and diphenylphosphoric acid). The high-boiling organic solvent can be used in an amount of from 0.01 to 3 times, and preferably from 0.01 to 1.0 times the weight of the oil-soluble dye.

These high-boiling organic solvents may be used singly or in admixture (such as tricresyl phosphate and dibutyl phthalate, trioctyl phosphate and di (2-ethylhexyl) sebacate, and dibutyl phthalate and poly(N-t-butylacrylamide)).

Compounds other than the foregoing high-boiling organic solvents that are used in the invention and/or synthesis methods of these high-boiling organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Nos. 276,319A, 286,253A, 289,820A, 309,158A, 309,159A, 309,160A, 509,311A, and 510,576A, East German Patent Nos. 147,009, 157,147, 159,573, and 225,240A, British Patent No. 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, J P-A-4-30165, JP-A-4-232946, and JP-A-4-346338.

The high-boiling organic solvent can be used in an amount of from 0.01 to 3.0 times, and preferably from 0.01 to 1.0 times the weight of the oil-soluble dye.

In the invention, the oil-soluble dye and the high-boiling organic solvent are emulsified and dispersed in the aqueous medium and then used. In emulsification and dispersion, a low-boiling organic solvent can be optionally used from the viewpoint of emulsification properties. The low-boiling organic solvent is an organic solvent having a boiling point of from about 30° C. to 150° C. at atmospheric pressure. For example, esters (such as ethyl acetate, butyl acetate, ethyl propionate, β-ethoxyethyl acetate, and methyl cellosolve acetate), alcohols. (such as isopropyl alcohol, n-butyl alcohol, and sec-butyl alcohol), ketones (such as methyl isobutyl ketone, methyl ethyl ketone, and cyclohexanone), amides (such as dimethylformamide and N-methylpyrrolidone), and ethers (such as tetrahydrofuran and dioxane) are preferably used. However, the invention is not limited thereto.

The emulsification and dispersion are carried out for dissolving the dye in the high-boiling organic solvent or a mixed solvent of the high-boiling organic solvent and the low-boiling organic solvent as the case may be, and dispersing the resulting oil phase in an aqueous phase composed mainly of water to prepare fine oil droplets of the oil phase. During this operation, if desired, additives such as surface active agents, wetting agents, dye stabilizers, emulsification stabilizers, antiseptic agents, and antifungal agents as described later can be added to either one or both of the aqueous phase and the oil phase.

As the emulsification method, a method of adding the oil phase into the aqueous phase is general, but a so-called phase inversion emulsification method in which the aqueous phase is dropped into the oil phase can also be preferably used. Also in the case where the yellow dye of the invention is water-soluble and the other components are oil-soluble, the aforementioned emulsification method can be used.

In the emulsification and dispersion, various surface active agents can be used. For example, anionic surface active agents (such as fatty acid salts, alkylsulfuric acid ester salts, alkylbenzenesulfonic acid salts, alkylnaphthalenesulfonic acid salts, dialkylsulfosuccinicacid salts, alkylphosophoric acid ester salts, naphthalenesulfonic acid-formalin condensates, and polyoxyethylene alkylsulfuric acid esters salts) and nonionic surface active agents (such as polyoxyethlene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers) are preferable. Also, SURFYNOLS (manufactured by Air Products & Chemicals) that is an acetylene based polyoxyethylene oxide surface active agent is preferably used. Also, amine oxide type ampholytic surface active agents such as N,N-dimethyl-N-alkylamine oxides are preferable. Further, surface active agents described on pages 37 to 38 of JP-A-59-157636 and in Research Disclosure No. 308119 (1989) can be used.

Also, for stabilization after the emulsification, a water-soluble polymer can be added in combination with the foregoing surface active agent. As the water-soluble polymer, for example, polyvinyl alcohol, polyvinylpyrrolidone, polyethylene oxide, polyacrylic acid, polyacrylamide, and copolymers thereof are preferably used. Also, it is preferable to use natural water-soluble polymers such as polysaccharides, casein, and gelatin. Further, for stabilizing the dye dispersion, it is possible to jointly use polyvinyl compounds, polyurethanes, polyesters, polyamides, polyureas, polycarbonates, etc. that are substantially insoluble in the aqueous medium and which are obtained by polymerization of acrylic acid esters, methacrylic acid esters, vinyl esters, acrylamides, methacrylamides, olefins, styrenes, vinyl ethers, or acrylonitriles. It is preferable that these polymers contain $-SO_3^-$, $-COO^-$. In the case where the polymer that is substantially insoluble in the aqueous medium is used together, it is preferable to use the high-boiling organic solvent in an amount of not more than 20% by weight, and more preferably not more than 10% by weight.

In the case where the aqueous ink composition is formed by dispersing the oil-soluble dye or the high-boiling organic solvent by emulsification and dispersion, it is especially important to control the particle size thereof. In forming an image by inkjet, it is essential to make the mean particle size small for the sake of enhancing the color purity or density. The volume-average particle size is preferably not more than 1 μm, and more preferably from 5 to 100 nm.

The volume-average particle size and particle size distribution of the dispersed particles can be easily measured according to known methods such as the static light scattering method, the dynamic light scattering method, the centrifugal sedimentation method, and the methods described on pages 417 to 418 of Jikken Kagaku Koza (Lectures on Experimental Chemistry), $4^{th}$ Edition. For example, the particle size can be easily measured by commercially available volume-average particle size analyzers (such as Microtrac UPA (manufactured by Nikkiso Co., Ltd.) upon dilution with distilled water such that the particle concentration in the ink composition is from 0.1 to 1% by weight. Further, the dynamic light scattering method utilizing the laser Doppler effect is especially preferable because the particle size to small sizes can be measured.

The volume-average particle size means a mean particle size weighed by the particle volume and is a value obtained by dividing the sum of ones obtained by multiplying the diameter of the individual particle by the volume of the particle by the total volume of the particles in aggregation of the particles. The volume-average particle size is described on page 119 of Kobunshi Ratekkusu No Kagaku (Chemistry of Synthetic Latices) (written by Soichi Muroi and published by Kobunshi Kankokai).

Also, it has become clear that the presence of coarse particles plays a very important role in the printing performance. That is, it has been noted that the coarse particles clog a head nozzle or do not clog the head nozzle but form stains to cause inferior discharge or slippage in discharge of the ink, thereby seriously influencing the printing performance. For preventing such a case, when forming the ink, it is important to suppress the number of particles of 5 μm or larger to not more than 10 and the number of particles of 1 μm or larger to not more than 100, respectively in 1 μL of the ink.

As a method of removing these coarse particles, known methods such as the centrifugal separation process and the microfiltration process can be employed. These separation measures may be carried out immediately after emulsification and dispersion, or after adding various additives such as wetting agents and surface active agents to the emulsified dispersion and immediately before filling in an ink cartridge.

As an effective measure of making the mean particle size small and making the coarse particles free, it is possible to use a mechanical emulsification device.

As the emulsification device, known devices such as a simple stirrer or impeller stirring mode, an in-line stirring mode, a mill mode using a colloid mill, etc., and an ultrasonic mode can be employed, but use of a high-pressure homogenizer is especially preferable.

The detailed mechanism of the high-pressure homogenizer is described in, for example, U.S. Pat. No. 4,533,254 and JP-A-6-47264. Examples of commercially available devices include Gaulin Homogenizer (manufactured by A.P. VGAULIN INC.), Microfluidizer (manufactured by MICROFLUIDEX INC.), and Ulthimaizer (manufactured by SUGINO MACHINE LIMITED).

Also, in recent years, a high-pressure homogenizer provided with a mechanism of atomization in an ultrahigh pressure jet flow as described in U.S. Pat. No. 5,720,551 is especially preferable for the emulsification and dispersion of the invention. Examples of the emulsification device using an ultrahigh pressure jet flow include DeBEE2000 (manufactured by BEE INTERNATIONAL LTD.).

In emulsification using a high-pressure emulsification and dispersion device, the pressure is 50 MPa or more, preferably 60 MPa or more, and more preferably 180 MPa or more.

For example, a method of using two kinds or more emulsification devices together, in which after emulsification by a stirring and emulsification machine, the emulsion is passed through a high-pressure homogenizer, is especially preferable. Also, a method in which after once undergoing emulsification and dispersion using these emulsification devices, additives such as wetting agents and surface active agents are added, and the ink is again passed through a high-pressure homogenizer during filling it in a cartridge is also preferable.

In the case where a low-boiling organic solvent is contained by adding to the high-boiling organic solvent, it is preferable to remove the low-boiling organic solvent from the viewpoints of stability and safety and hygiene of the emulsion. As a method of removing the low-boiling organic solvent, various known methods can be used depending upon the kind of the solvent. That is, examples include the evaporation process, the vacuum evaporation process, and the ultrafiltration process. It is preferable to carry out the removal step of the low-boiling organic solvent as quick as possible immediately after the emulsification.

For the details of the method for the preparation of inkjet recording ink, reference can be made to JP-A-5-148436, JP-A-5-295312, JP-A-7-97541, JP-A-7-82515, and JP-A-7-118584. These methods can be used also for the preparation of the inkjet recording ink of the invention.

The inkjet recording ink composition obtained in the invention may comprise functional components incorporated therein for providing various functions. Examples of these functional components employable herein include an antidrying agent for preventing clogging due to drying of the ink i n an injection port, a penetration accelerator for accelerating penetration of the ink into paper, a UV absorber, an antioxidant, a viscosity modifier, a surface tension modifier, a dispersant, a dispersion stabilizer, an antifungal agent, a rust preventive, a pH adjuster, an antifoaming agent, and a chelating agent. These functional components can be properly chosen and used in the ink of the invention in proper amounts. These functional components each may have one or more functions. Accordingly, when considering the mixing proportion of the following functional components, functional components which overlap on each other in some of their functions are treated such that the content of these compounds are each independently calculated as the respective functional components.

As the antidrying agent employable herein, water-soluble organic solvents having a vapor pressure lower than water are preferable. Specific examples of such water-soluble organic solvents include polyhydric alcohols (represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane), lower alkyl ethers of polyhydric alcohols (such as ethylene glycol monomethyl (or monoethyl) ether, diethylene glycol monomethyl (or monoethyl) ether, and triethylene glycol monoethyl (or monobutyl) ether), heterocyclic compounds (such as 2-pyrrolidone, N-methyl-2-pyrrolidone, 1,3-dimethyl-2-imidazolidinone, and N-ethylmorpholine), sulfur-containing compounds (such as sulfolane, dimethyl sulfoxide, and 3-sulfolene), polyfunctional compounds (such as diacetone alcohol and diethanolamine), and urea derivatives. Of these compounds, polyhydric alcohols such as glycerin and diethylene glycol are more preferable. Also, the antidrying agent may be used singly or in admixture of two or more thereof. It is preferable that the antidrying agent be contained in an amount of from 10 to 50% by weight in the ink.

As the penetration accelerator employable herein, alcohols (such as ethanol, isopropanol, butanol, di (or tri) ethylene glycol monobutyl ether, and 1,2-hexanediol) and nonionic surface active agents (such as sodium lauryl sulfate and sodium oleate) can be used. When the penetration accelerator is contained in an amount of from 10 to 30% by weight in the ink, there is a sufficient effect. It is preferable to use the penetration accelerator in the addition amount within the range where bleeding of printing and print-through are not caused.

In the invention, as the UV absorber that can be used for the sake of improving preservability of the image, benzotriazole based compounds described in JP-A-58-185677, JP-A-61-190537, JP-A-2-782, JP-A-5-197075, and JP-A-9-34057; benzophenone based compounds described in JP-A-46-2784, JP-A-5-194483, and U.S. Pat. No. 3,214,463; cinnamic acid based compounds described in JP-B-48-30492, JP-B-56-21141, and JP-A-10-88106; triazine based compounds described in JP-A-4-298503, JP-A-8-53427, JP-A-8-239368, JP-A-10-182621, and JP-T-8-501291; compounds described in Research Disclosure No. 24239; and compounds of absorbing UV rays to emit fluorescence, which are a so-called fluorescent brightener, represented by stilbene based compounds and benzoxazole based compounds can be used.

In the invention, as the antioxidant that can be used for the sake of improving preservability of the image, various organic based or metal complex based antifading agents can be used. Examples of organic antifading agents include hydroquinones, alkoxyphenols, dialkoxyphenols, phenols, anilines, amines, indanes, chromans, alkoxyanilines, and heterocyclic compounds. Examples of the metal complexes include nickel complexes and zinc complexes. More specifically, compounds described in the patents cited in Research Disclosure No. 17643, No. VII, Items I to J, ibid. No. 15162, ibid. No. 18716, page 650, left column, ibid. No. 36544, page 527, ibid. No. 307105, page 872, and ibid. No. 15162 and the formulae of representative examples and illustrative compounds described on pages 127 to 137 of JP-A-62-215272 can be used.

Examples of the antifungal agent that can be used in the invention include sodium dehydroacetate, sodium benzoate, sodium pyridinethione-1-oxide, ethyl p-hydroxybenzoate, and 1,2-benzisothiazolin-3-one and salts thereof. It is preferable that the antifungal agent is used in an amount of from 0.02 to 5.00% by weight in the ink.

Incidentally, the details are described in, for example, Bokin-Bobaizai Jiten (Encyclopedia of Antibacterial and Antifungal Agents) (edited by The Society for Antibacterial and Antifungal Agents, Japan, Encyclopedia Editorial Committee).

Also, examples of the rust preventive include acidic sulfites, sodium thiosulfate, thioglycolic acid ammon, diisopropylammonium nitrite, pentaerythritol tetranitrate, dicyclohexylammonium nitrite, and benzotriazole. It is preferable that the rust preventive is contained in an amount of from 0.02 to 5.00% by weight in the ink.

The pH adjuster that can be used in the invention can be suitably used from the standpoints of pH adjustment, impartation of dispersion stability, etc., and it is preferable that the ink be adjusted at a pH of from 8 to 11 at 25° C. In the case where the pH is less than 8, the solubility of the dye is lowered so that the nozzle is clogged, whereas when the pH exceeds 11, water resistance is liable to be deteriorated. As the pH adjuster, the basic pH adjuster includes organic bases and inorganic alkalis, and the acidic pH adjuster includes organic acids and inorganic acids.

As the basic compounds there may be used inorganic compounds such as sodium hydroxide, potassium hydroxide, sodium carbonate, potassium carbonate, sodiumbicarbonate, potassium bicarbonate, sodium acetate, potassium acetate, sodium phosphate and sodium phosphate dibasic or organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

As the acidic compound there may be used an inorganic compound such as hydrochloric acid, sulfuric acid, phosphoric acid, boric acid, sodium hydrogensulfate, potassium hydrogensulfate, potassium dihydrogenphosphate and sodium dihydrogenphosphate or an organic compound such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolic acid and quinolinic acid.

The ink of the invention preferably has a conductivity of from 0.01 to 10 S/m, more preferably from 0.05 to 5 S/m.

The measurement of conductivity can be accomplished by an electrode method using a commercially available saturated potassium chloride.

The conductivity of the ink can be controlled mainly by the concentration of ions in the aqueous solution. When the salt concentration is high, desalting may be effected using an ultrafilttation membrane or the like. Alternatively, the conductivity of the ink can be adjusted by the addition of various organic salts or inorganic salts.

Examples of the inorganic salt include inorganic compound salts such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium hydrogenphosphate, boric acid, potassium dihydrogenphosphate and sodium dihydrogenphosphate. Organic compounds such as sodium acetate, potassium acetate, potassium tartrate, sodium tartrate, sodium benzoate, potassium benzoate, sodium p-toluenesulfonate, potassium saccharinate, potassium phthalate and sodium picrate may be used.

The conductivity of the ink of the invention can be adjusted also by properly determining the components of the aqueous medium described later.

The ink of the invention exhibits a viscosity of from 1 to 20 mPa·s, more preferably from 2 to 15 mPa·s, particularly preferably from 2 to 10 mPa·s at 25° C. When the viscosity of the ink exceeds 20 mPa·s, the resulting recorded image can be fixed at a reduced rate. Further, the resulting ink exhibits a deteriorated ejectability. On the contrary, when the viscosity of the ink falls below 1 mPa·s, the resulting recorded image results in bleeding and thus exhibits a reduced quality.

The adjustment of viscosity can be arbitrarily carried out by controlling the added amount of the ink solvent. Examples of the ink solvent employable herein include glycerin, diethyleneglycol, triethanolamine, 2-pyrrolidone, diethylene glycolmonobutyl ether, and triethylene glycol monobutyl ether.

Further, a viscosity adjustor may be used in the present invention. Examples of the viscosity adjustor employable herein include celluloses, water-soluble polymers such as polyvinyl alcohol, and nonionic surface active agents. For the details of these viscosity adjustors, reference can be made to "Nendo Chousei Gijutsu (Technology for Preparation of Viscosity)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162-174, 1997.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K.K. In the present invention, a Type VM-100A-L vibration viscometer (produced by YAMAICHI ELECTRONICS CO., LTD.) was used to measure viscosity at 25° C. The unit of viscosity is Pa·s. In practice, however, mPa·s is used.

The ink to be used in the invention preferably has a surface tension of from 20 to 50 mN/m, more preferably from 20 to 40 mN/m at 25° C., regardless of which it is static or dynamic. When the surface tension of the ink exceeds 50 mN/m, the resulting ink exhibits a drastic deterioration in print quality such as ejection stability and resistance to bleading and whisker during color mixing. On the contrary, when the surface tension of the ink falls below 20 mN/m, the resulting ink can be attached to hard surface when ejected, causing defective printing.

For the purpose of adjusting surface tension, various surface active agents such as the aforementioned cationic, anionic, nonionic and betaine-based surface active agents may beadded. These surface active agents may be used in combination of two or more thereof.

Known examples of the static surface tension measuring method include capillary rise method, dropping method, and ring method. In the invention, as the static surface tension measuring method there is used a perpendicular plate method.

When a thin glass or platinum plate is hanged partially dipped in a liquid, surface tension of the liquid acts downward along the length of the plate in contact with the liquid. The surface tension is measured by balancing this force by a upward force.

As the dynamic surface tension measuring methods there are known vibration jet method, meniscus dropping method and maximum bubble pressure method as disclosed in "Shinjikken Kagaku Koza (New Institute of Experimental Chemistry), 18th ed., Kaimen to Koroido (Interface and Colloid)", Maruzen, pp. 69-90 (1977). Further, a liquid film destruction method is known as disclosed in JP-A-3-2064. In the invention, as the dynamic viscosity measuring method there is used a differential bubble pressure method. The principle and method of effecting this measuring method will be described hereinafter.

When bubbles are formed in a solution which has been stirred to uniformity, a new gas-liquid interface is produced. Surface active agent molecules in the solution then gather on the surface of water at a constant rate. The bubble rate (rate of formation of bubbles) is changed. As the formation rate decreases, more surface active agent components gather on the surface of bubbles, reducing the maximum bubble pressure shortly before the burst of bubbles. Thus, the maximum bubble pressure (surface tension) with respect to bubble rate can be detected. As a method for the measurement of dynamic surface tension there is preferably used a method which comprises forming bubbles in a solution using a large probe and a small probe, measuring the differential pressure of the two probes in the state of maximum bubble pressure, and then calculating the dynamic surface tension from the differential pressure.

The content of nonvolatile components in the ink of the invention is preferably from 10 to 70% by weight based on the total weight of the ink from the stand point of ejection stability, print quality, various fastnesses of image and elimination of bleeding of image printed and stickiness of printed surface, more preferably from 20 to 60% by weight based on the total weight of the ink from the standpoint of ejection stability and elimination of bleeding of image printed.

The term "nonvolatile component" as used herein is meant to indicate a liquid, solid or polymer component having a boiling point of not lower than 150° C. at 1 atm. Examples of the nonvolatile components to be incorporated in the inkjet recording ink include dyes, high boiling solvents, and polymer latexes, surface active agents, dye stabilizers, antifungal agents and buffers to be optionally added. Most of these nonvolatile components except dye stabilizers deteriorate the dispersion stability of the ink and are still present on the inkjet image-receiving paper after printing, inhibiting the stabilization of the ink by association of dyes on the image-receiving paper and hence impairing various fastness of image area and accelerating bleeding in image under high temperature and humidity conditions.

A polymer compound may be incorporated in the ink of the invention. The term "polymer compound" as used herein is meant to indicate all polymer compounds having a number-average molecular weight of not lower than 5,000 contained in the ink. Examples of these polymer compounds include water-soluble polymers compounds substantially soluble in aqueous media, water-dispersible polymer compounds such as polymer latex and polymer emulsion, and alcohol-soluble polymer compounds soluble in a polyvalent alcohol which is used as an auxiliary solvent. Any of these polymer compounds are included in the polymer compounds of the invention so far as they can be substantially dissolved or dispersed uniformly in the ink solution.

Specific examples of the water-soluble polymer compounds employable herein include water-soluble polymers such as polyvinyl alcohol, silanol-modified, polyvinyl alcohol, carboxymethyl cellulose, hydroxyethyl cellulose, polyvinyl pyrrolidone, polyalkylene oxide (e.g., olyethylene oxide, polypropylene oxide) and polyalkylene oxide derivative, natural water-soluble polymers such as polysaccharides starch, cationated starch, casein and gelatin, aqueous acrylic resins such as polyacrylic acid, polyacrylamide and copolymer thereof, aqueous alkyd resins, and water-soluble polymer compounds having —$SO_3^-$ or —$COO^-$ group in its molecule substantially soluble in an aqueous medium. Examples of the polymer latex include styrene-butadiene latex, styrene-acryl latex, and polyurethane latex. Examples of the polymer emulsion include acryl emulsion.

These water-soluble polymer compounds may be used singly or in combination of two or more thereof.

These water-soluble polymer compounds are used to adjust the viscosity of the ink to a range such that the ink can be fairly ejected as already mentioned. However, when the amount of these water-soluble polymer compounds is too great, the resulting ink exhibits too high a viscosity that deteriorates the ejection stability thereof. Thus, when the ink is aged, the resulting precipitate causes easy clogging of the nozzle.

The amount of the polymer compound as viscosity adjustor to be incorporated is from 0 to 5% by weight, preferably from 0 to 3% by weight, more preferably from 0 to 1% by weight based on the total weight of the ink, though depending on the molecular weight of the compound to be added (The higher the molecular weight of the compound is, the lower the amount of the compound to be incorporated is).

Also, in the invention, the foregoing various cationic, anionic or nonionic as well as betaine surface active agents can be used as the dispersant and dispersion stabilizer, and fluorine based or silicone based compounds and chelating agents represented by EDTA can be used as the antifoaming agent as the need arises.

The reflection medium to be used in the invention will be hereunder described. Examples of the reflection medium include recording paper and recording film. A support in the recording paper and recording film is made of a chemical pulp (such as LBKP and NBKP), a mechanical pulp (such as GP, PGW, RMP, TMP, CTMP, CMP, and CGP), a used paper pulp (such as DIP), etc. If desired, the pulp is mixed with conventionally known additives such as pigments, binders, sizing agents, fixing agents, cationic agents, and paper strength additives, and the mixture is processed by various devices such as a fourdrinier paper machines and cylinder paper machines. The thus produced support can be used. In addition to these supports, synthetic paper and plastic film sheets can be used. It is desired that the support has a thickness of from 10 to 250 μm and a basis weight of from 10 to 250 g/m$^2$.

An image receiving material may be prepared by providing an image-receiving layer and a backcoat layer on the support as it is. Also, an image receiving material may be prepared by size pressing with starch, polyvinyl alcohol, etc. or providing an anchor coating layer, and then providing an image-receiving layer and a backcoat layer. Further, the support may be subjected to flattening processing by a calendering device such as a machine calender, a TG calender, and a soft calender.

In the invention, as the support, paper and plastic films, the both sides of which are laminated with a polyolefin (such as polyethylene, polystyrene, polybutene, and copolymers thereof) or polyethylene terephthalate are preferably used. It is preferable to add a white pigment (such as titanium oxide and zinc oxide) or a coloring dye (such as cobalt blue, ultramarine, and neodymium oxide) to the polyolefin.

The image-receiving layer to be provided on the support contains a porous material and an aqueous binder. Also, it is preferable that the ink-receiving layer contains a pigment. As the pigment, a white pigment is preferable. Examples of white pigments include inorganic white pigments (such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate) and organic pigments (such as styrene based pigments, acrylic pigments, urea resins, and melamine resins). Of these pigments, porous white inorganic pigments are preferable, and synthetic amorphous silica having a large pore area is especially suitable. As the synthetic amorphous silica, any of an anhydrous silicate obtained by the dry production process (gas-phase-method) and a hydrated silicate obtained by the wet production process can be used.

As the recording paper having the aforementioned pigment incorporated in the image-receiving layer there may be specifically used one disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, JP-A-2001-301314, etc.

Examples of the aqueous binder to be contained in the image-receiving layer include water-soluble polymers (such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxides, and polyalkylene oxide derivatives) and water-dispersible polymers (such as styrene butadiene latices and acrylic emulsions). The aqueous binder can be used singly or in admixture of two or more thereof. In the invention, of these aqueous binders, polyvinyl alcohol and silanol-modified polyvinyl alcohol are especially suitable from the standpoints of adhesion to the pigment and resistance to peeling of the ink absorbing layer.

The image-receiving layer can contain mordants, waterproofing agents, light fastness enhancers, surface active agents, hardeners, and other additives in addition to the pigment and aqueous binder.

It is preferable that the mordant to be added in the image-receiving layer is immobilized. For this purpose, polymer mordants are preferably used.

The polymer mordants are described in JP-A-48-28325, JP-A-54-74430, JP-A-54-124726, JP-A-55-22766, JP-A-55-142339, JP-A-60-25850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-1261236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing polymer mordants described on pages 212 to 215 of JP-A-1-161236 are especially preferable. When the polymer mordants described in this patent are used, images having excellent image quality are obtained, and light fastness of images are improved.

The waterproofing agent is effective for making the image waterproof, and cationic resins are especially desired as the waterproofing agent. Examples of cationic resins include polyamide polyamine epichlorohydrin, polyethyleneimine, polyaminesulfone, dimethyldiallylammonium chloride polymers, and cationic polyacrylamide. The content of the cationic resin is preferably from 1 to 15% by weight, and especially preferably from 3 to 10% by weight based on the whole of the solid contents of the ink absorbing layer.

Examples of the light-fastness improver and gas resistance improver include phenolic compounds, hindered phenolic compounds, thioether compounds, thiourea compounds, thiocyanic acid compounds, amine compounds, hindered amine compounds, TENPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds, and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, JP-A-11-321090, etc.

The surface active agent acts as a coating aid, a peeling improver, a slipperiness improver, or anantistatic agent. The surface active agent is described in JP-A-62-173463 and JP-A-62-183457.

Organic fluoro compounds may be used in place of the surface active agent. It is preferable that the organic fluoro compounds are hydrophobic. Examples of the organic fluoro compounds include fluorine based surface active agents, oily fluorine based compounds (such as fluoric oils), and solid fluorine based compounds (such as tetrafluoroethylene resins). The organic fluoro compounds are described in JP-B-57-9053 (columns 8 to 17), JP-A-61-20994, and JP-A-62-135826.

As the hardener, materials described on page 222 of JP-A-1-161236, JP-A-9-263036, JP-A-10-119423, and JP-A-2001-310547 can be used.

Examples of other additives that are added to the image-receiving layer include pigment dispersants, thickeners, antifoaming agents, dyes, fluorescent brighteners, antiseptic agents, pH adjusters, matting agents, and hardeners. Incidentally, the ink absorbing layer may be of a single layer structure or a double-layer structure.

The recording paper and recording film can be provided with a backcoat layer. As components that can be added to this backcoat layer, white pigments, aqueous binders, and other components can be enumerated.

Examples of white pigments that are contained in the backcoat layer include white inorganic pigments (such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehimite, aluminum hydroxide, alumina, lithopone, zeolite, hydrated halloysite, magnesium carbonate, and magnesium hydroxide) and organic pigments (such as styrene based plastic pigments, acrylic plastic pigments, polyethylene, microcapsules, urea resins, and melamine resins).

Examples of aqueous binders that are contained in the backcoat layer include water-soluble polymers (such as styrene/maleic acid salt copolymers, styrene/acrylic acid salt copolymers, polyvinyl alcohol, silanol-modified polyvinyl alcohol, starch, cationated starch, casein, gelatin, carboxymethyl cellulose, hydroxyethyl cellulose, and polyvinylpyrrolidone) and water-dispersible polymers (such as styrene butadiene latices and acrylic emulsions). Examples of other components that are contained in the backcoat layer include antifoaming agents, foam inhibitors, dyes, fluorescent brighteners, antiseptic agents, and waterproofing agents.

A polymer fine particle dispersion may be added to the constitutional layers (including the backcoat layer) of the inkjet recording paper and recording film. The polymer fine particle dispersion is used for the purpose of improving the film physical properties such as dimensional stabilization, curling prevention, adhesion prevention, and film crack prevention. The polymer fine particle dispersion is described in JP-A-62-245258, JP-A-62-136648, and JP-A-62-110066. When a polymer fine particle dispersion having a low glass transition temperature (not higher than 40° C.) is added to the mordant-containing layer, it is possible to prevent crack and curling of the layer. Also, when a polymer fine particle dispersion having a high glass transition temperature is added to the back layer, it is also possible to prevent curling of the layer.

The ink jet recording process to which the ink of the present invention is applied is not limited. The ink set of the present invention may be used in any known recording process such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording process include a process which comprises ejecting many portions of an ink having a low concentration called photoink in a small volume, a process which comprises using a plurality of inks having substantially the same hue but different densities to improve the image quality, and a process involving the use of a colorless transparent ink.

The inkjet recording ink of the invention can be used for applications other than the inkjet recording. For example, it can be used for materials for display image, image forming materials of interior decoration materials, and image forming materials of outdoor decoration materials.

The materials for display image include posters, wallpaper, decorative small articles (such as ornaments and dolls), commercial advertising leaflets, packing paper, wrapping materials, paper bags, polyvinyl bags, packaging materials, signboards, pictures drawn in the side surfaces of transports (such as automobiles, buses, and electric trains) or images attached thereto, and logotype-provided clothes. In the case where the dye of the invention is a display image forming material, the term "image" as referred to herein includes not only images in the narrow sense but also all patterns by dyes that a person can acknowledge, such as abstract designs, letters, and geometric patterns.

The interior decoration materials include wallpaper, decorative small articles (such as ornaments and dolls), members of lighting equipment, members of furniture, and design members of floor and ceiling. In the case where the dye of the invention is an image forming material, the term "image" as referred to herein includes not only images in the narrow sense but also all patterns by dyes that a person can acknowledge, such as abstract designs, letters, and geometric patterns.

The outdoor decoration materials include wall materials, roofing materials, signboards, gardening materials, outdoor decorative small articles (such as ornaments and dolls), and members of outdoor lightening equipment. In the case where the dye of the invention is an image forming material, the term "image" as referred to herein includes not only images in the narrow sense but also all patterns by dyes that a person can acknowledge, such as abstract designs, letters, and geometric patterns.

In the foregoing applications, examples of media on which patterns are formed include various materials such as paper, fabrics, cloths (including non-woven fabrics), plastics, metals, an ceramics. With respect to the dyeing mode, the pigment can be fixed by mordanting or textile printing, or in the form of a reactive dye having a reactive group introduced thereinto. Above all, it is preferable to undergo dyeing in the mordanting state.

In the preparation of the ink, ultrasonic vibration can be applied during the step of dissolving additives such as dye or other steps.

Referring to the application of ultrasonic vibration, an ultrasonic energy which is equal to or higher than the energy given by the recording head is previously applied during the preparation of the ink to remove bubbles under the pressure given by the recording head.

The ultrasonic vibration normally comprises an ultrasonic wave having a frequency of not lower than 20 kHz, preferably not lower than 40 kHz, more preferably 50 kHz. The energy given by the ultrasonic vibration to solution is normally not smaller than $2 \times 10^7$ J/m$^3$, preferably not smaller than $5 \times 10^7$ J/m$^3$, more preferably not smaller than $1 \times 10^8$ J/m$^3$. The time during which the ultrasonic vibration is applied is normally from about 10 minutes to 1 hour.

The step of applying ultrasonic vibration maybe effected at any time after the addition of dyes to the medium to exert desired effects. The desired effects can be exerted also when the ink thus completed is given ultrasonic vibration after storage. However, ultrasonic vibration is preferably applied during the dissolution and/or dispersion of dyes in the medium to exert a greater effect of removing bubbles and accelerate the dissolution and/or dispersion of the dyes in the medium.

In other words, the aforementioned step of applying at least ultrasonic vibration may be effected either during or after the step of dissolving and/or dispersing the dyes in the medium. In some detail, the step of applying at least ultrasonic vibration may be arbitrarily effected once or more times during the period between the preparation of the ink and the completion of the product.

Referring to the embodiment of implementation of the invention, the step of dissolving and/or dispersing the dyes in the medium preferably comprises a step of dissolving the dyes in a part of the medium and a step of mixing the solution with the remaining portion of the medium. More preferably, ultrasonic vibration is applied at at least one of the aforementioned steps. Even more preferably, at least ultrasonic vibration is applied at the step of dissolving the dyes in a part of the medium.

The aforementioned step of mixing the solution with the remaining portion of the medium may comprise a single step or a plurality of steps.

Further, heat deaeration or vacuum deaeration is preferably effected additionally in the ink production according to the invention to enhance the effect of removing bubbles from the ink. The heat deaeration step or vacuum deaeration step is preferably effected at the same time with or after the step of mixing the solution with the remaining portion of the medium.

As a means of generating ultrasonic vibration at the step of applying ultrasonic vibration there may be used a known apparatus such as ultrasonic dispersing machine.

In the process for the preparation of the ink of the invention, it is important to effect a step of removing dust as solid content by filtration after the preparation of the ink solution. For this job, a filter is used. As such a filter there is used a filter having an effective pore diameter of not greater than 1 μm, preferably from not smaller than 0.05 μm to not greater than 0.3 μm, particularly preferably from not smaller than 0.25 µm to not greater than 0.3 µm. As the filter material there maybe used any of various known materials. In the case where a water-soluble dye ink is used, a filter prepared for aqueous solvent is preferably used. In particular, a filter made of a polymer material which can difficultly give dust is preferably used. Filtration may be accomplished by pumping the solution through the filter or maybe effected under pressure or reduced pressure.

Filtration is often accompanied by the entrapment of air in the solution. Bubbles due to air thus entrapped can often cause disturbance in image in the ink jet recording. Thus, the deaeration step is preferably provided separately. Deaeration may be accomplished by allowing the solution thus filtered to stand or by the use of various methods such as ultrasonic deaeration and vacuum deaeration using a commercially available apparatus. The ultrasonic deaeration may be effected preferably for about 30 seconds to 2 hours, more preferably for about 5 minutes to 1 hour.

These jobs are preferably effected in a space such as clean room and clean bench to prevent the contamination by dust. In the invention, these jobs are preferably effected in a space having a cleanness degree of not greater than class 1,000. The term "cleanness degree" as used herein is meant to indicate the value measured by a dust counter.

The volume of the ink droplet of the invention to be ejected onto the recording material is from not smaller than 0.1 pl to not greater than 100 pl, preferably from not smaller than 0.5 pl to not greater than 50 pl, particularly preferably from not smaller than 2 pl to not greater than 50 pl.

In the invention, the ink jet recording method is not limited. The ink of the present invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink. The volume of the ink droplet to be ejected onto the recording material is mainly controlled by the printing head.

In the case of thermal ink jet method for example, the volume of the ink droplet to be ejected onto the recording material can be controlled by the structure of the printing head. In some detail, the size of the ink chamber, the heating portion and the nozzle can be properly changed to eject the ink droplet in a desired size. Even in the case of thermal ink jet method, a plurality of printing heads having heating portions or nozzles having different sizes can be provided to accomplish the ejection of a plurality of ink droplets having different sizes.

In the case of drop-on-demand method utilizing a piezoelectric element, the volume of the ink droplet to be ejected onto the recording material can be changed by the structure of the printing head as in the case of thermal ink jet method. However, by controlling the waveform of the driving signal for driving the piezoelectric element as described later, a plurality of ink droplets having different sizes can be ejected from one printing head having the same structure.

In the invention, the frequency at which the ink is ejected onto the recording material is not lower than 1 KHz.

In order to record a high quality image as in the case of photographic printing, it is necessary that the ejection density be not smaller than 600 dpi (number of dots per inch) to reproduce a high sharpness image with ink droplets having a small size.

On the other hand, in the recording method involving the ejection of ink droplets from a head having a plurality of nozzles wherein the recording paper and the head move in the direction perpendicular to each other, the number of heads which can be driven at the same time is limited to a range of several tens to about 200. Even in the recording method using a fixed head called line head, the number of heads which can be driven at the same time is limited to hundreds. This is attributed to the fact that the driving power is limited or the heat generated by the head affects the image quality, making it impossible to drive many head nozzles at the same time.

By raising the driving frequency, the recording rate can be enhanced.

The control over the ejection frequency can be effected by controlling the frequency of the head driving signal for heating the head in the case of thermal ink jet method.

In the case of piezoelectric method, the control over the ejection frequency can be effected by controlling the frequency of the signal for driving the piezoelectric element.

The driving of the piezoelectric head will be described hereinafter. The image signal to be printed is controlled by a printer control to determine the size of ink droplet to be ejected, the ejection rate and the ejection frequency. Thus, a signal for driving the printing head is generated. The driving signal thus generated is then supplied into the printing head. The size of ink droplet to be ejected, the ejection rate and the ejection frequency are controlled by the signal for driving the piezoelectric element. The size of ink droplet to be ejected and the ejection rate are determined by the form and amplitude of the driving waveform. The ejection frequency is determined by the repetition of signal.

When the ejection frequency is predetermined to 10 KHz, the printing head is driven every 100 microseconds and one line of recording is completed in 400 microseconds. By arranging the printer system such that the recording paper moves at a rate of 1/600 inch, i.e., about 42 micrometers per 400 microseconds, printing can be effected at a rate of one sheet per 1.2 seconds.

Referring to the configuration of the printing device and the printer of the invention, embodiments as disclosed in JP-A-11-170527 are desirable. Referring to the configuration of the ink cartridge, embodiments as disclosed in JP-A-5-229133 are desirable. Referring to the configuration of the suction means, the cap for covering the printing head, etc., embodiments as disclosed in JP-A-7-276671 are desirable. It is also desirable that a filter for removing bubbles as disclosed in JP-A-9-277552 be provided in the vicinity of the printing head.

The surface of the nozzle is preferably subjected to water repellent treatment as disclosed in Japanese Patent Application No. 2001-016738. The invention may be applied to a printer connected to computer or a device specialized in the printing of photograph.

In the inkjet recording method to which the ink of the invention is applied, the rate at which the inkjet recording ink comprising at least one yellow dye of the invention dissolved and/or dispersed in an aqueous medium is ejected onto the recording material is not smaller than 2 m/sec, preferably not smaller than 5 m/sec.

The control over the ejection rate is carried out by controlling the waveform and amplitude of the signal for driving the printing head.

Further, by properly using a plurality of driving signals having different waveforms, a plurality of droplets having different sizes can be ejected from one printing head.

The invention will be further described in the following examples, but the invention should not be construed as being limited thereto.

EXAMPLES

To the following components was added ultrapure water (resistivity: not lower than 18 MΩ) to make 1 l. The mixture was then heated to a temperature of from 30° C. to 40° C. with stirring for 1 hour. Thereafter, the mixture was vacuum filtered through a microfilter having an average pore diameter of 0.25 μm to prepare a yellow ink solution Y-101.

[Formulation of Yellow Ink Y-101]

| (Solid content) | |
|---|---|
| Yellow dye of the invention (YI-58) ($\lambda$max: 445 nm; I($\lambda$max + 70 nm)/I($\lambda$max): 0.013) | 35 g/l |
| Proxel | 5 g/l |
| urea | 10 g/l |

| (Liquid component) | |
|---|---|
| Triethylene glycol monobutyl ether (TGB) | 100 g/l |
| Glycerin (GR) | 115 g/l |
| Diethylene glycol (DEG) | 70 g/l |
| 2-Pyrrolidone | 35 g/l |
| Triethanolamine (TEA) | 8 g/l |
| Surfinol STG (SW) | 10 g/l |

The aforementioned formulation was followed except that a magenta dye and a cyan dye were added. Thus, a dark yellow ink solution DY-101 was prepared, The yellow dye "YI-58" corresponds to the aforementioned exemplary compound I-58.

[Formulation of Dark Yellow Ink DY-101]

| (Solid content) | |
|---|---|
| Yellow dye of the invention (YI-58) | 35 g/l |
| Magenta dye (A) | 2 g/l |
| Cyan dye (B) | 2 g/l |
| Proxel | 5 g/l |

| (Liquid component) | |
|---|---|
| Triethylene glycol monobutyl ether (TGB) | 100 g/l |
| Glycerin (GR) | 115 g/l |
| Diethylene glycol (DEG) | 70 g/l |
| 2-Pyrrolidone | 35 g/l |
| Triethanolamine (TEA) | 8 g/l |
| Surfinol STG (SW) | 10 g/l |

The aforementioned magenta dye (A) and cyan dye (B) are as follows.

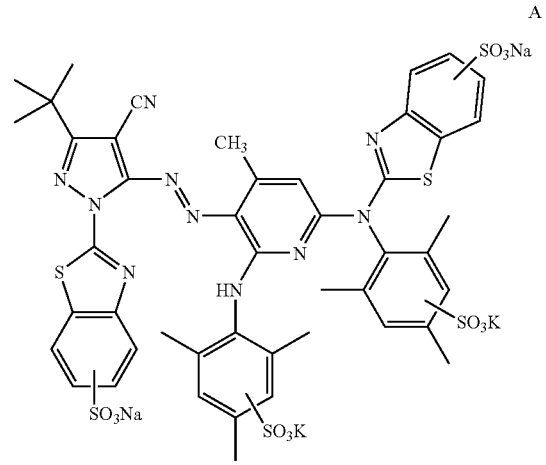

A

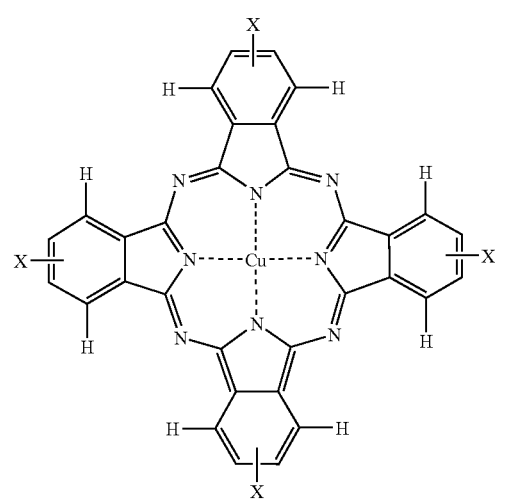

B

X: $SO_2CH_2CH_2CH_2SO_3Li$

The oxidation potential of the yellow dye (YI-58) as used herein was 1.0 V (vs SCE) or more positive in any measurement method of the dropping mercury electrode method, the cyclic voltammetry (CV) method or the rotating ring disk electrode method using a 1 mmol/L aqueous solution of the dye.

As comparative dyes comprising the following two dyes with respect to these inks, yellow inks Y-104, Y-105 and Y-106 and dark yellow inks DY-104, DY-105 and DY-106 were prepared in the same manner as mentioned above.

1) Yellow dye (C) having an oxidation potential of not higher than 1.0 V (vs SCE); and 2) Yellow dye (D) (Direct Yellow 11) having a I(λmax) I(λmax+70 nm) ratio of greater than 0.4

The yellow dye (C) had a I(λmax)/I(λmax+70 nm) ratio of not greater than 0.4. The yellow dye (D) had an oxidation potential of not greater than 1.0 V (vs SCE).

The yellow dye (C), has the following structural formula.

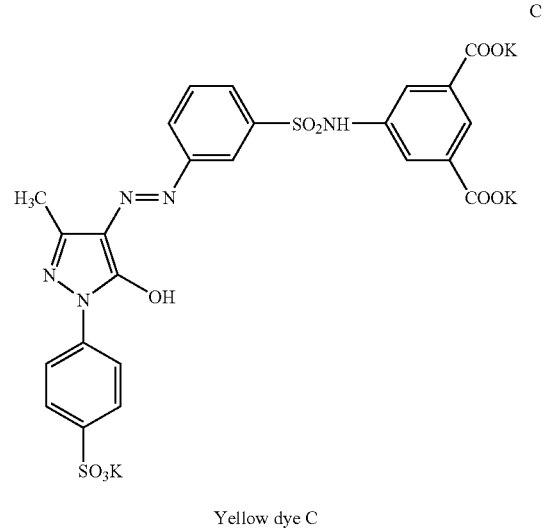

Yellow dye C

Further, inks Y-102 to 106 and DY-102 to 106 having a water-miscible organic solvent concentration different from the inks prepared above as set forth in Table 1 were prepared from the aforementioned dyes and the liquid components used in the inks Y-101 and DY-101 in different amounts.

As comparative inks there were used yellow ink cartridge and dark yellow ink cartridge for PM-950C (produced by EPSON CO., LTD.).

TABLE 1

| Sample No. | Yellow dye | Water-miscible organic solvent having a solubility of less than 10 (g/100 g) | | Water-miscible organic solvent having a solubility of not smaller than 10 (g/100 g) | | Remarks |
| --- | --- | --- | --- | --- | --- | --- |
| | | Component | Concentration (wt-%) | Component | Concentration (wt-%) | |
| Y-101, DY-101 | YI-58 | GR | 11.5 | TGB/DEG/2-pyrrolidone/TEA (weight ratio: 1/1/0.2/0.02) | 21.3 | Comparative |
| Y-102, DY-102 | YI-58 | GR/MFTG (weight ratio: 1/1) | 33.8 | — | 0 | Inventive |
| Y-103, DY-103 | YI-58 | GR/MFTG (weight ratio: 1/1) | 25 | DEG/2-pyrrolidone/TEA (weight ratio: 1/0.2/0.02) | 5 | Inventive |
| Y-104, DY-104 | C | GR/MFTG (weight ratio: 1/1) | 33.8 | — | 0 | Comparative |
| Y-105, DY-105 | C | GR/MFTG (weight ratio: 1/1) | 25 | DEG/2-pyrrolidone/TEA (weight ratio: 1/0.2/0.02) | 5 | Comparative |
| Y-106, DY-106 | D | GR/MFTG (weight ratio: 1/1) | 25 | DEG/2-pyrrolidone/TEA (weight ratio: 1/0.2/0.02) | 5 | Comparative |
| PM-950C | PM950C | | | | | Comparative |

The solvents having solubility of a yellow dye of not smaller than 10 (g/100 g) at 25° C. were TGB, DEG, 2-pyrrolidone, and TEA. The solvents having solubility of a yellow dye of smaller than 10 (g/100 g) at 25° C. were GR, PFG (propylene glycol monopropyl ether), MFTG (tripropylene glycol monoethyl ether or tripropylene glycol monomethyl ether), and MFDG (diisopylene glycol monomethyl ether). MFTG in Table 1 stands for tripropylene glycol monomethyl ether.

These inks were packed in the yellow ink and dark yellow ink cartridges of a Type PM-950C ink jet printer (produced by EPSON CO., LTD.), respectively. As the other color inks there were used the inks dedicated to PM-950C. In this arrangement, a chromatic yellow image pattern and gray image pattern having a stepwise gradation of density were printed. Separately, the images were each visually evaluated for color tone using a test image chart according to ISO/JIS 12640. As an image-receiving sheet there was used Inkjet Paper "Gasai", produced by Fuji Film Co. Ltd. The images printed on the image-receiving sheet were each evaluated for image quality, ink ejectability and image fastness.

(Evaluation Experiment)
1) For the evaluation of ejection stability, the cartridge was mounted on the printer. The ejection of the inks from all the nozzles was then confirmed. Printing was then made on 20 sheets of A4 size paper. Evaluation was made according to the following criterion.

A: No print disturbance during the period between the beginning and the end of printing;

B: Occurrence of output with print disturbance;

C: Print disturbance during the period between the beginning and the end of printing This experiment was conducted shortly after packing of ink (ejection stability A) and after two weeks of storage at 40° C. and 80% RH.

2) For the evaluation of preservability of yellow dye, printed samples were evaluated for the following properties.

(1) For the evaluation of light-fastness, the print which had been made was immediately measured for image density Ci by means of a reflection densitometer (X-Rite 310TR), irradiated with light from a xenon lamp (85,000 lux) using a weatherometer produced by Atlas Electric Devices, Inc. for 10 days, and then again measured for image density Cf to determine the percent dye remaining (Ci/Cf×100). The percent dye remaining was measured at three points of reflection density (1, 1.5, 2). Those showing a percent dye remaining of not smaller than 70% at any of the three density points were defined as A, those showing a percent dye remaining of smaller than 70% at two of the three points were defined as B, and those showing a percent dye remaining of smaller than 70% at all the three density points were defined as C.

(2) For the evaluation of heat fastness, the sample was stored under conditions of 80° C. and 70% RH for 10 days. The sample was measured for density using X-rite 310TR before and after storage to determine the percent dye remaining which was then evaluated. The percent dye remaining was then evaluated at three reflection density points, i.e., 1, 1.5 and 2. Those showing a percent dye remaining of not smaller than 90% at any of the three density points were defined as A. Those showing a percent dye remaining of less than 90% at two of the three density points were defined as B. Those showing a percent dye remaining of less than 90% at all the density points were defined as C.

(3) For the evaluation of ozone resistance, the aforementioned photographic gloss paper having an image formed thereon was stored in a box the ozone gas concentration in which had been predetermined to 0.5 ppm for 7 days. The sample was measured for density using a reflection densitometer (Type X-rite 310TR) before and after storage to determine the percent dye remaining which was then evaluated. The percent dye remaining was then evaluated at three reflection density points, i.e., 1, 1.5 and 2. The ozone gas concentration in the box was predetermined using an ozone gas monitor (Model: OZG-EM-01) produced by APPLICS INC.

Those showing a percent dye remaining of not smaller than 80% at any of the three density points were defined as A. Those showing a percent dye remaining of less than 80% at two of the three density points were defined as B. Those showing a percent dye remaining of less than 70% at all the density points were defined as C.

3) For the evaluation of image bleeding under high humidity conditions, a print pattern having four yellow 3 cm×3 cm patterns arranged in a checkerboard form with a 1 mm white gap between the patterns was prepared. This image sample was then stored at 25° C. and 90% RH for 72 hours. The rise of density due to bleeding of yellow dye in the white gap was then observed. Those showing a yellow density rise of not greater than 0.01 from that observed shortly after printing through a status A yellow filter were defined as A. Those showing a rise of from 0.01 to 0.05 were defined as B. Those showing a rise of not smaller than 0.05 were defined as C.

The results are set forth in Table 2.

TABLE 2

| Sample No. | Ejection stability A | Ejection stability B | Light-fastness | Heat fastness | Ozone resistance | Bleeding | Remarks |
| --- | --- | --- | --- | --- | --- | --- | --- |
| Y-101, DY-101 | A | A | A | A | A | B | Comparative |
| Y-102, DY-102 | A | A | A | A | A | A | Inventive |
| Y-103, DY-103 | A | A | A | A | A | A | Inventive |
| Y-104, DY-104 | A | A | B | B | C | A | Comparative |
| Y-105, DY-105 | A | A | B | B | C | A | Comparative |
| Y-106, DY-106 | A | A | B | B | C | A | Comparative |
| PM-950C | A | A | B | B | C | B | Comparative |

As can be seen in the results of Table 2, the systems comprising the ink of the invention satisfy all the requirements. The comparative examples are inferior to the inventive examples with respect to ozone resistance or bleeding.

The comparison of test chart image shows that the systems comprising the yellow dye (D) give an image having ill-balanced colors.

In accordance with the invention, an inkjet recording ink can be provided comprising an azo dye which exhibits a good hue and an excellent ejection stability, weathering resistance and water resistance as an aqueous ink advantageous in handleability, odor, safety, etc.

This application is based on Japanese patent application JP 2003-028484, filed on Feb. 5, 2003, the entire content of which is hereby incorporated by reference, the same as if set forth at length.

What is claimed is:

1. An inkjet recording ink comprising:
    an aqueous medium comprising at least one water-miscible organic solvent; and
    at least one dye dissolved and/or dispersed in the aqueous medium, wherein said at least one dye has a maximum absorption spectrum $\lambda$max at a wavelength range of from 390 nm to 470 nm and a I($\lambda$max+70 nm)/I($\lambda$max) ratio of not greater than 0.4, in which I($\lambda$max) is the absorbance at $\lambda$max and I($\lambda$max+70 nm) is the absorbance at $\lambda$max+70 nm,
    wherein the inkjet recording ink exhibits an accelerated fading rate constant of not greater than $5.0 \times 10^2$ [hour$^{-1}$], in which the accelerated fading rate constant is determined by printing the ink on a reflection medium to prepare a printed matter, measuring a reflection density through a status A filter to define an initial value of reflection density ($D_B$) in the yellow region by one point between 0.90 and 1.10, and acceleratedly fading the printed matter by using an ozone fading tester capable of always generating 5 ppm of ozone, so as to define the fading rate constant from the time required until the reflection density reaches 80% of the initial value; and
    said at least one water-miscible organic solvent satisfies one of the following requirements 1) and 2):
    1) said at least one dye has a solubility in all of said at least one water-miscible organic solvent of less than 10 (g/100 g) at 25° C.;
    2) said at least one dye has a solubility in at least one of said at least one water-miscible organic solvent of not smaller than 10 (g/100 g) at 25° C., with the proviso that the sum of the weight of the water-miscible organic solvent is not greater than 10% of the weight of the ink.

2. The inkjet recording ink as defined in claim 1, wherein the dye exhibits a $\lambda$max at a wavelength range of from 390 nm to 470 nm and a I($\lambda$max+70 nm)/I($\lambda$max) ratio of not greater than 0.2 in which I($\lambda$max) is the absorbance at $\lambda$max and I($\lambda$max+70 nm) is the absorbance at $\lambda$max+70 nm.

3. The inkjet recording ink as defined in claim 1, wherein the dye has an oxidation potential of more positive than 1.0 V (vs SCE).

4. The inkjet recording ink as defined in claim 2, wherein the dye has an oxidation potential of more positive than 1.0 V (vs SCE).

5. The inkjet recording ink as defined in claim 1, wherein the total amount of said at least one water-miscible organic solvent is 1 to 60 weight % based on the ink.

6. The inkjet recording ink as defined in claim 1, wherein the number of the water-miscible organic solvents is at least two in the case 2).

7. The inkjet recording ink as defined in claim 1, wherein the amount of said at least one dye is 0.2 to 20 weight % based on the ink.

* * * * *